(12) United States Patent
Yamasaki et al.

(10) Patent No.: US 7,366,072 B2
(45) Date of Patent: Apr. 29, 2008

(54) OPTICAL HEADS DEVICE AND CONTROL METHOD OF OPTICAL HEAD

(75) Inventors: Fumitomo Yamasaki, Nara (JP); Takuya Wada, Kyoto (JP); Hideki Aikoh, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 536 days.

(21) Appl. No.: 11/005,071

(22) Filed: Dec. 6, 2004

(65) Prior Publication Data
US 2005/0128897 A1 Jun. 16, 2005

(30) Foreign Application Priority Data
Dec. 10, 2003 (JP) ............... 2003-411440

(51) Int. Cl.
*G11B 7/00* (2006.01)
(52) U.S. Cl. ............ 369/53.21; 369/53.4; 369/94
(58) Field of Classification Search ........... 369/44.35, 369/44.36, 44.25, 44.26, 44.15, 44.14, 94, 369/44.37, 53.4, 53.21
See application file for complete search history.

(56) References Cited

U.S. PATENT DOCUMENTS

| | | | |
|---|---|---|---|
| 6,236,031 B1 | 5/2001 | Ueda | |
| 6,314,064 B1* | 11/2001 | Ueda et al. | 369/44.23 |
| 6,683,732 B2 | 1/2004 | Maeda et al. | |
| 6,829,203 B2* | 12/2004 | Yonezawa et al. | 369/44.27 |
| 2002/0105736 A1 | 8/2002 | Maeda et al. | |
| 2004/0136280 A1 | 7/2004 | Fujiune et al. | |

FOREIGN PATENT DOCUMENTS

| | | |
|---|---|---|
| EP | 1 253 587 A2 | 10/2002 |
| JP | 2000-149283 | 5/2000 |
| JP | 2002-237071 | 8/2002 |

OTHER PUBLICATIONS

European Search Report for Application No. EP 04 02 9174, dated Nov. 17, 2006.

* cited by examiner

*Primary Examiner*—Nabil Hindi
(74) *Attorney, Agent, or Firm*—RatnerPrestia

(57) ABSTRACT

In an optical head for performing the reproduction or recording of information for two or more types of different optical disks, the damage caused to an optical disk or an objective lens by collision between the optical disk and the objective lens is avoided. An optical heads device for reproducing or recording two or more types of information recording mediums different from each other comprises a first optical system, a second optical system, and a control unit for avoiding the collision between an optical disk and a second objective lens when a first optical system is in operation.

34 Claims, 11 Drawing Sheets

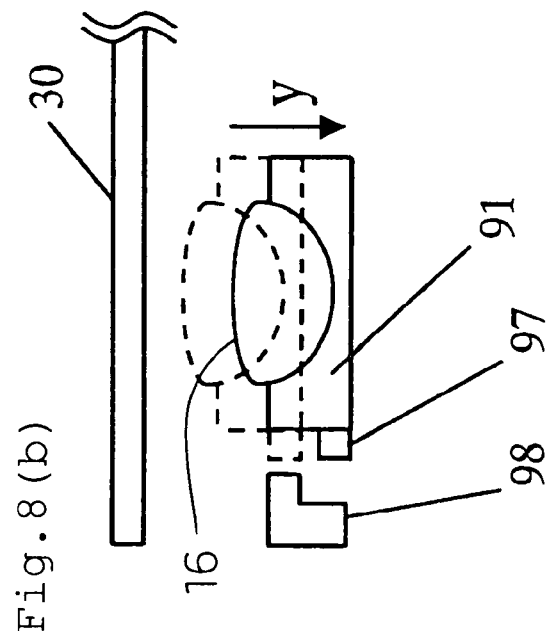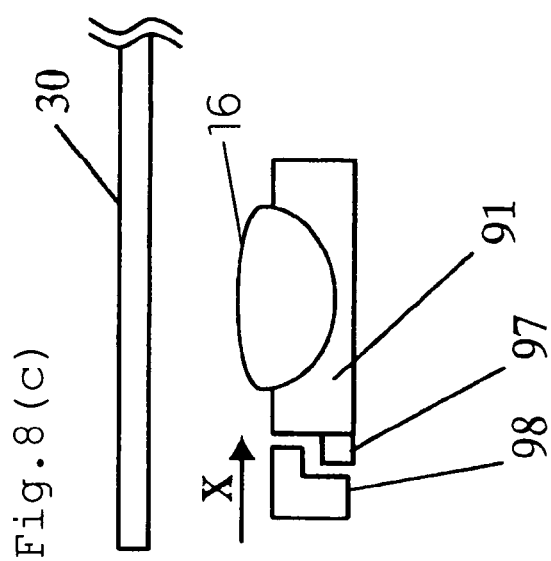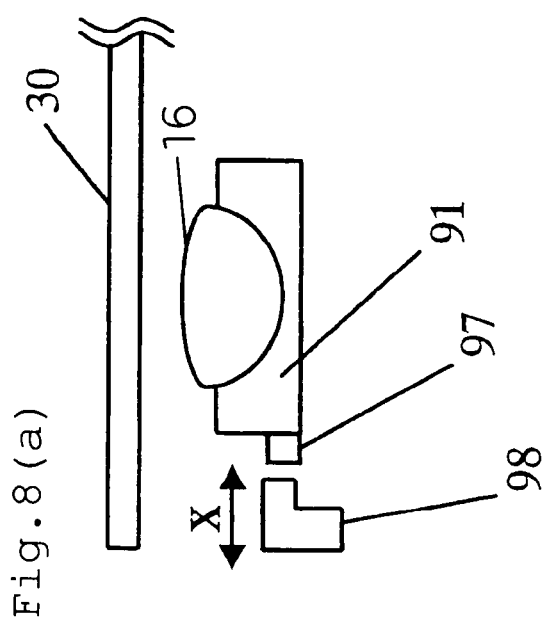

OPTICAL HEADS DEVICE AND CONTROL METHOD OF OPTICAL HEAD

BACKGROUND OF THE INVENTION

1. Field of the Invention

The present invention relates to an optical heads device and the like used in an optical disk device and the like for reproducing or recording information from and to an optical recording medium such as an optical disk and the like. In particular, it relates to an optical heads device capable of reproducing or recording information for two or more types of optical disks different from each other.

2. Related Art of the Invention

In general, to increase recording capacity in an optical disk device, it is necessary either to reduce the wavelength of a laser light used for recording and reproduction of information on an optical disk, which is an optical recording medium, or to increase the numerical aperture (NA) of an objective lens for focusing the laser light onto the optical disk, so that recording density of the optical disk is increased.

In recent years, in the optical head used for the optical disk device, for example, the numerical aperture of the objective lens for CD (Compact Disc) has become 0.45, and the numeral aperture of the objective lens for DVD (Digital Versatile Disc) has become 0.6, and moreover, since an effective diameter itself of the objective lens has become small due to reduction in size of the optical head, a so-called working distance (WD) between the top end of the objective lens and the surface of the optical disk has been reduced, thereby increasing the possibility that the objective lens ends up coming into collision with the surface of the optical disk in contrast to a conventional lens.

Further, in the case of CD, while the thickness of a transparent substrate is 1.2 mm, in the case of DVD, it is 0.6 mm and thin, and the distance to an information recording layer protected by the transparent substrate is shortened. Hence, scars caused on the surface of the optical disk by the collision of the objective lens greatly affect signals.

Further, with the advent of a rewritable DVD such as DVD-RAM (Digital Versatile Disc-Random Access Memory) and the like, it has become possible for the user to perform a recording on the optical disk, and therefore, serious consequence has been often developed by the scars of the surface of the optical disk and this has necessitated the reduction of the collision between the objective lens and the surface of the optical disk.

Moreover, in recent years, a recordable superdense optical disk with a blue-violet laser as a light source (Blu-ray Disc, numerical aperture of the objective lens 0.85, thickness of the transparent substrate 0.1 mm) has been also developed, and in such a superdense optical disk of a thin film substrate, a collision-avoidance function for avoiding the collision between the objective lens and the optical disk has become indispensable by now.

In the meantime, in this kind of the circumstance where there exist plural types of optical disks, an optical disk device which can reproduce or record both of a conventional optical disk (for example, CD and DVD) and a new optical disk (for example, Blu-ray Disc) is commonly desired. Under such circumstance, a number of optical disk devices capable of reproducing or recording plural types of optical disks have been proposed, and for example, an optical heads device that selects plural objective lenses and performs reproduction or recording of information for the plural types of optical disks different in the thickness of a disk substrate has been proposed.

In FIG. 9 is shown a schematic block diagram of the optical heads device for selecting the objective lens and performing the reproduction or recording of information. In FIG. 9, reference numeral 101 denotes a semiconductor laser for emitting a laser light of a wavelength of 650 nm, reference numeral 102 a beam splitter, reference numeral 103 a ¼ wavelength plate, reference numeral 104 a collimator lens, reference numeral 105 a reflecting mirror, reference numeral 106 an objective lens, reference numeral 107 an anamorphic lens, reference numeral 108 a photosensing element, and reference numeral 109 a biaxial actuator corresponding to a first objective lens driving means, and these constitute a first optical system 110 as a first optical head.

Similarly, reference numeral 111 denotes a photosensing and light emitting integrated element in which the semiconductor laser for emitting a laser light of a wavelength of 780 nm and the photosensing element are integrated, reference numeral 112 a polarization hologram, reference numeral 113 a ¼ wavelength plate, reference numeral 114 a collimator lens, reference numeral 115 a reflecting mirror, reference numeral 116 an objective lens, and reference numeral 119 a biaxial actuator corresponding to a second objective lens driving means, and these constitute a second optical system 120 as a second optical head.

Further, reference numeral 130 denotes a first optical disk having a transparent substrate of 0.6 mm in thickness, and reference numeral 140 denotes a second optical disk having a transparent substrate of 1.2 mm in thickness. While, in FIG. 9, the first optical disk 130 and the second optical disk 140 are shown to be superposed, in reality, either one only of the optical disks is inserted into a drive (not shown).

The operation in case of performing the reproduction or recording for the first optical disk 130 will be described.

The laser light of a linear polarized light having a wavelength of 650 nm emitted from the semiconductor laser 101 transmits the beam splitter 102, and is converted into a circularly polarized light at the ¼ wavelength plate 103, and after that, is converted into a parallel light at the collimator lens 104, and is reflected at the reflecting mirror 105, and is converged into an information recording layer of the first optical disk 130 as a light spot by the objective lens 106 across the transparent substrate of 0.6 mm in thickness. The laser light reflected at the first optical disk 130 transmits again the objective lens 106, and is reflected at the reflecting mirror 105, and transmits the collimator lens 104, and is converted into a linearly polarized light different from an outward route at the ¼ wavelength plate 103, and after that, it is reflected at the beam splitter 102, and is led to the photosensing element 108 by the anamorphic lens 107.

The laser light detected by the photosensing element 108 is subjected to photoelectric conversion, and after that, it is arithmetically operated, and generates a focusing error signal for following a surface deviation of the first optical disk 130 and a tracking error signal for following a decentering. The biaxial actuator 109 drives the objective lens 106 in a biaxial direction by these focusing error and tracking error signals, so that the light spot follows an information track of the first optical disk 130 in a rotation state.

Similarly, the operation in case of performing the reproduction or recording for the second optical disk 140 will be described.

The laser light of a linear polarized light having a wavelength of 780 nm emitted from the semiconductor laser inside the photosensing and light emitting integrated element 111 transmits the polarization hologram 112, and is converted into a circularly polarized light at the ¼ wavelength plate 113, and after that, it is converted into a parallel light by the collimator lens 114, and is reflected at the reflecting mirror 115, and is converged into an information recording layer of the second optical disk 140 as a light spot by the objective lens 116 across the transparent substrate having a thickness of 1.2 mm. The laser light reflected at the second optical disk 140 transmits again the objective lens 116, and is reflected at the reflecting mirror 115, and transmits the collimator lens 114, and is converted into a linear polarized light different from the outward route by the ¼ wavelength plate 113, and after that, it is guided to the photosensing element inside the photosensing and light emitting integrated element 111 by the polarization hologram 112.

The laser light detected by the photosensing element inside the photosensing and light emitting integrated element 111 is arithmetically operated after photoelectric conversion, and generates the focusing error signal for following the surface deviation of the second optical disk 140 and the tracking error signal for following the decentering. The biaxial actuator 119 drives the objective lens 116 in the biaxial direction by these focusing error and tracking error signals, so that the light spot follows an information track of the second optical disk 140 in a rotation state.

FIG. 10 schematically shows the configuration of a biaxial actuator 109. The biaxial actuator 119 has the same configuration. In FIG. 10, reference numeral 106 denotes an objective lens, reference numeral 191 a lens holder, reference numeral 192 a suspension wire, reference numeral 193 a fixing unit, reference numeral 194 a coil, reference numeral 195 a magnetic yoke, and reference numeral 196 a magnet.

The lens holder 191 is fixed to one end of four suspension wires 192, and moreover, the focusing and tracking coils 194 are fixed to it.

These coils 194 are arranged in opposite to a magnetic circuit constituted by the magnetic yoke 195 and the magnet 196. The lens holder 191, the objective lens 106, and the coil 194 are integrally formed and constitute a movable unit. In these configurations, the movable portion is movably supported in a focusing direction and a tracking direction, and the position of the objective lens 106 can be controlled in a biaxial direction by the current flown through the coil 194.

Since the biaxial actuator to support the movable portion by the four suspension wires in this way is highly efficient and excellent in miniaturization and cost reduction, it is widely used as an optical head biaxial actuator.

Next, as the optical head comprising a conventional collision avoidance function, there has been known an optical head described in Japanese Patent Application Laid-Open No. 2002-237071. In FIG. 11 is shown a schematic block diagram of the objective lens comprising a conventional collision avoidance mechanism. In FIG. 11, reference numeral 201 denotes an objective lens, reference numeral 202 a lens barrel for supporting the objective lens, reference numeral 203 an effective diameter portion (hereinafter referred to also as lens effective surface) in the light emitting surface of the objective lens, reference numeral 204 a collision avoidance unit, and reference numeral 205 an optical disk.

The collision avoidance unit 204, which is a buffer layer, contacts the optical disk 205 prior to the lens effective surface 203 of the objective lens 201. The collision avoidance unit 204 is circularly formed on the surface of the objective lens 201 by resin, and an aperture diameter of the collision avoidance unit 204 is larger than the diameter of the lens effective surface 203. As a resin material, an ultraviolet curing resin softer than the material of the surface of the optical disk 205 can be also selected.

As shown in FIG. 11, the collision avoidance unit 204 is adhered to the inner surface of the lens barrel 202 supported by its peripheral side surface. Further, the collision avoidance unit 204 protrudes to the optical disk 205 side from the end surface of the lens barrel 202. Naturally, the collision avoidance unit 204 protrudes to the optical disk 205 side from the lens effective surface 203.

Based on the above described configuration, even when the objective lens 201 approaches the surface of the optical disk 205, since the collision avoidance unit 204 softer than the surface of the optical disk 205 contacts the surface of the optical disk 205 prior to the lens effective surface 203, there is an advantage that scars on the surface of the optical disk 205 are reduced.

However, in the case of a configuration where the biaxial actuator is supported by elasticity of the four suspension wires in the optical heads device for selecting plural objective lenses and performing the reproduction or recoding of information from and to the optical disk of two or more different types having the transparent substrates different in thickness, the objective lens at the side not used for reproduction or recording of information may be moved by vibration or impact along with its movable portion. Therefore, the biaxial actuator is unable to be kept at a static position particularly under the circumstance, such as in a mobile application, where the external force is easy to be applied, and there may be the case that the biaxial actuator frequently collides with the optical disk by the movement, resulting in a damage to the optical disk or the objective lens.

In the case where there is the possibility that the optical disk and the objective lens frequently collide in this way, it is necessary to reduce the collision itself of the collision avoidance unit for controlling the damage caused by the collision between the optical disk and the objective lens.

The present invention solves the above described conventional problems, and an object of the invention is to provide an optical heads device capable of avoiding the damage of the optical disk or the objective lens in the optical disk for selecting plural objective lenses and performing the reproduction or recording of information for the optical disk of two or more types having the transparent substrates different in thickness.

SUMMARY OF THE INVENTION

The $1^{st}$ aspect of the present invention is an optical heads device for reproducing or recording two or more types of information recording medium different from each other, comprising:

a first optical head comprising a first objective lens for reproducing or recording a signal from and to a first information recording medium, and a first objective lens driving means of performing a focusing operation for allowing said first objective lens to follow an information track of said first information recording medium;

a second optical head comprising a second objective lens for reproducing or recording a signal from and to the second information recording medium, and a second objective lens driving means of performing a focusing operation for allowing said second objective lens to follow an information track of said second information recording medium, and collision avoidance means of avoiding a collision between said first information recording medium and said second objective lens when said first optical head operates to reproduce or record the signal from and to said first information recording medium.

The 2$^{nd}$ aspect of the present invention is the optical heads device according to the 1$^{st}$ aspect of the present invention, wherein said collision avoidance means controls said second objective lens driving means by corresponding to the operation of said first objective lens driving means, so that the collision between said first information recording medium and said second objective lens is avoided.

The 3$^{rd}$ aspect of the present invention is the optical heads device according to the 2$^{nd}$ aspect of the present invention, wherein said collision avoidance means allows said second objective lens driving means to operate by using a control signal corresponding to the control signal for allowing said first objective lens driving means to operate, so that the collision between said first information recording medium and said second objective lens is avoided.

The 4$^{th}$ aspect of the present invention is the optical heads device according to the 3$^{rd}$ aspect of the present invention, wherein said control signal is an electric current.

The 5$^{th}$ aspect of the present invention is the optical heads device according to the 4$^{th}$ aspect of the present invention, wherein said collision avoidance means has correction means of correcting a current for allowing said first objective lens driving means to operate based on at least the characteristic of said second optical head, and said second objective lens driving means is driven by the current corrected by said correction means.

The 6$^{th}$ aspect of the present invention is the optical heads device according to the 4$^{th}$ aspect of the present invention, wherein said correction means corrects the current for allowing said first objective lens driving means to operate by a gain based on the acceleration sensitivity of said first objective lens driving means and the acceleration sensitivity of said second objective lens driving means.

The 7$^{th}$ aspect of the present invention is the optical heads device according to the 6$^{th}$ aspect of the present invention, wherein said correction means has a high pass filter for cutting a frequency component in the current for allowing said first objective lens driving means to operate or the current corrected by said gain equal to or less than a resonance frequency of said second objective lens driving means.

The 8$^{th}$ aspect of the present invention is the optical heads device according to the 1$^{st}$ aspect of the present invention, wherein said collision avoidance means controls said second optical head to operate independently from the operation of said first optical head, thereby avoiding the collision between said first information recording medium and said second objective lens.

The 9$^{th}$ aspect of the present invention is the optical heads device according to the 8$^{th}$ aspect of the present invention, wherein said collision avoidance means performs a control in such a manner that said second objective lens driving means performs a focusing operation for the surface or the information recording layer of said first information recording medium.

The 10$^{th}$ aspect of the present invention is the optical heads device according to the 8$^{th}$ aspect of the present invention, wherein said collision avoidance means has an acceleration sensor for detecting an acceleration applied to said optical heads device, and controls the operation of said second objective lens driving means based on the magnitude and direction of the acceleration detected by said acceleration sensor so that said second objective lens does not contact the surface of said first information recording medium.

The 11$^{th}$ aspect of the present invention is the optical heads device according to the 8$^{th}$ or the 10$^{th}$ aspect of the present invention, wherein said collision avoidance means controls the operation of said second objective lens driving means so that said second objective lens moves in a direction in which said second objective lens keeps away from said first information recording medium by the current of a constant magnitude.

The 12$^{th}$ aspect of the present invention is the optical heads device according to the 1$^{st}$ aspect of the present invention, wherein said collision avoidance means comprises regulating means of regulating a movable range of said second objective lens so that the intervals between the surfaces of said second objective lens and said first information recording medium are substantially kept constant.

The 13$^{th}$ aspect of the present invention is the optical heads device according to the 1$^{st}$ aspect of the present invention, wherein said collision avoidance means performs an operation of said avoiding of collision when a control signal that exceeds predetermined threshold value flows to said first objective lens driving means at the operation time of said first optical head.

The 14$^{th}$ aspect of the present invention is the optical heads device according to the 1$^{st}$ aspect of the present invention, wherein said collision avoidance means avoids the collision between said second information recording medium and said first objective lens when said first optical head operates to reproduce or record the signal from and to said second information recording medium.

The 15$^{th}$ aspect of the present invention is the optical heads device according to the 14$^{th}$ aspect of the present invention, wherein said collision avoidance means controls said first objective lens driving means by corresponding to the operation of said second objective lens driving means, so that the collision between said second information recording medium and said first objective lens is avoided.

The 16$^{th}$ aspect of the present invention is the optical heads device according to the 15$^{th}$ aspect of the present invention, wherein said collision avoidance means allows said first objective lens driving means to operate by using the control signal corresponding to the control signal for allowing said second objective lens driving means to operate, so that the collision between said second information recording medium and said first objective lens is avoided.

The 17$^{th}$ aspect of the present invention is the optical heads device according to the 16$^{th}$ aspect of the present invention, wherein said control signal is an electric current.

The 18$^{th}$ aspect of the present invention is the optical heads device according to the 16$^{th}$ aspect of the present invention, wherein said collision avoidance means has correction means of correcting a current for allowing said second objective lens driving means to operate based on at least the characteristic of said first optical head, and said first objective lens driving means is driven by the current corrected by said correction means.

The 19$^{th}$ aspect of the present invention is the optical heads device according to the 18$^{th}$ aspect of the present invention, wherein said correction means corrects the current to allow said second objective lens driving means to operate by the gain based on the acceleration sensitivity of said first objective lens driving means and the acceleration sensitivity of said second objective lens driving means.

The 20$^{th}$ aspect of the present invention is the optical heads device according to the 19$^{th}$ aspect of the present invention, wherein said correction means has a high pass filter for cutting a frequency component in the current for operating said second objective lens driving means or the current corrected by said gain equal to or less than a resonance frequency of said first objective lens driving means.

The 21$^{st}$ aspect of the present invention is the optical heads device according to the 14$^{th}$ aspect of the present invention, wherein said collision avoidance means controls said first optical head to operate independently from the operation of said second optical head, thereby avoiding the collision between said second information recording medium and said first objective lens.

The 22$^{nd}$ aspect of the present invention is the optical heads device according to the 21$^{st}$ aspect of the present invention, wherein said collision avoidance means performs a control in such a manner that said first objective lens driving means performs a focusing operation for the surface or the information recording layer of said second information recording medium.

The 23$^{rd}$ aspect of the present invention is the optical heads device according to the 21$^{st}$ aspect of the present invention, wherein said collision avoidance means has an acceleration sensor for detecting an acceleration applied to said optical heads device, and controls the operation of said first objective lens driving means based on the magnitude and direction of the acceleration detected by said acceleration sensor so that said first objective lens does not contact the surface of said second information recording medium.

The 24$^{th}$ aspect of the present invention is the optical heads device according to the 21$^{st}$ or the 23$^{rd}$ aspect of the present invention, wherein said collision avoidance means controls the operation of said first objective lens driving means so that said first objective lens moves in a direction in which said first objective lens keeps away from said second information recording medium by the current of a constant magnitude.

The 25$^{th}$ aspect of the present invention is the optical heads device according to the 14$^{th}$ aspect of the present invention, wherein said collision avoidance means comprises regulating means of regulating a movable range of said first objective lens so that the intervals between the surfaces of said first objective lens and said second information recording medium are substantially kept constant.

The 26$^{th}$ aspect of the present invention is the optical heads device according to the 14$^{th}$ aspect of the present invention, wherein said collision avoidance means performs an operation of said avoiding of collision when a control signal that exceeds predetermined threshold value flows to said first objective lens driving means at the operation time of said first optical head.

The 27$^{th}$ aspect of the present invention is the optical heads device according to the 1$^{st}$ or the 14$^{th}$ aspect of the present invention, wherein at least either one from among said first objective lens and said second objective lens is an objective lens compatible to the reproduction or recording of two or more types of the information recording medium having different wavelengths.

The 28$^{th}$ aspect of the present invention is an optical information reproduction device, wherein said reproducing means comprising reproducing means of reproducing information from two or more types of information recording medium different from each other uses the optical heads device according to the 1$^{st}$ or the 14$^{th}$ aspect of the present invention.

The 29$^{th}$ aspect of the present invention is an optical information reproduction device, wherein said recording means comprising recording means of recording information for two or more types of information recording medium different from each other uses the optical heads device according to the 1$^{st}$ or the 14$^{th}$ aspect of the present invention.

The 30$^{th}$ aspect of the present invention is, in an optical heads device for reproducing or recording two or more types of information recording medium different from each others, a control method for controlling the operations of a first optical head comprising a first objective lens for reproducing or recording a signal from and to a first information recording medium and first objective lens driving means of performing a focusing operation for allowing said first objective lens to follow an information track of said first information recording medium, and a second optical head comprising a second objective lens for reproducing or recording a signal from and to a second information recording medium, and second objective lens driving means of performing a focusing operation for allowing said second objective lens to follow an information track of said second information recording medium, wherein, said method comprises a step of controlling said second objective lens driving means by corresponding to the operation of said first objective lens driving means when said first optical head operates to reproduce or record the signal from and to said first information recording medium, and by said step, a collision between said first information recording medium and said second objective lens is avoided.

The 31$^{st}$ aspect of the present invention is a program of the control method of the optical head according to the 30$^{th}$ aspect of the present invention, said program allowing a computer to execute a step of controlling said second objective lens driving means by corresponding to the operation of said first objective lens driving means when said first optical head operates to reproduce or record the signal from and to said first information recording medium.

By the above described configuration, at the time of reproduction and recording of information, the objective lens at the side not used for the reproduction or recording of the information can be prevented from colliding with the optical disk to damage the optical disk or the objective lens.

The 32$^{nd}$ aspect of the present invention is a recording medium, that can be processed by a computer and stores a program according to the 31$^{st}$ aspect of the present invention.

Further, by the above described configuration, even when the biaxial actuator for supporting the movable portion by the four suspension wires excellent in performance is used for objective lens driving means, at the time of the reproduction and recording of information, the objective lens at the side not used for the reproduction or recording of the information can be prevented from colliding with the optical disk to damage the optical disk or the objective lens.

Further, by the above described configuration, by using a relatively easy control method, at the time of the reproduction and recording of information, the objective lens at the side not used for the reproduction or recording of information can be prevented from colliding with the optical disk to damage the optical disk or the objective lens.

Further, by the above described configuration, at the time of the reproduction and recording of information, the objective lens not used for the reproduction or recording of information can be more reliably prevented from colliding with the optical disk to damage the optical disk or the objective lens.

Further, by the above described configuration, at the time of the reproduction and recording of information, the objective lens not used for the reproduction or recording of information can be more reliably prevented from colliding with the optical disk to damage the optical disk or the objective lens.

Further, by the above described configuration, for any of the first information recording medium and the second information recording medium, at the time of the reproduction or recording of information, the objective lens not used for the reproduction or recording of information can be prevented from colliding with the optical disk to damage the optical disk or the objective lens.

Further, by the above described configuration, even for the optical head corresponding to the reproduction or recoding of information recording mediums of three or more types different in wavelength, at the time of the reproduction and recording of information, the objective lens at the side not used for the reproduction or recording of information can be more reliably prevented from colliding with the optical disk to damage the optical disk or the objective lens.

According to the present invention, in the optical heads device comprising an optical head for selecting plural objective lenses for two or more type of optical disks and performing the reproduction or recording of information, there is obtained an excellent advantage that, at the time of the reproduction and recording of information, the objective lens at the side not used for the reproduction or recording of information can be prevented from colliding with the optical disk to damage the optical disk or the objective lens.

BRIEF DESCRIPTION OF THE DRAWINGS

FIG. 8(a) is a view showing a detailed configuration in the vicinity of a lens holder 91 of the optical heads device and the operation of its collision avoidance in the third embodiment of the present invention, FIG. 8(b) is a view showing the detailed configuration in the vicinity of the les holder 91 of the optical heads device and the operation of its collision avoidance in the third embodiment of the present invention, and FIG. 8(c) is a view showing the detailed configuration in the vicinity of the lens holder 91 of the optical heads device and the operation of its collision avoidance in the third embodiment of the present invention;

DESCRIPTION OF REFERENCE NUMERALS

Figure 1:
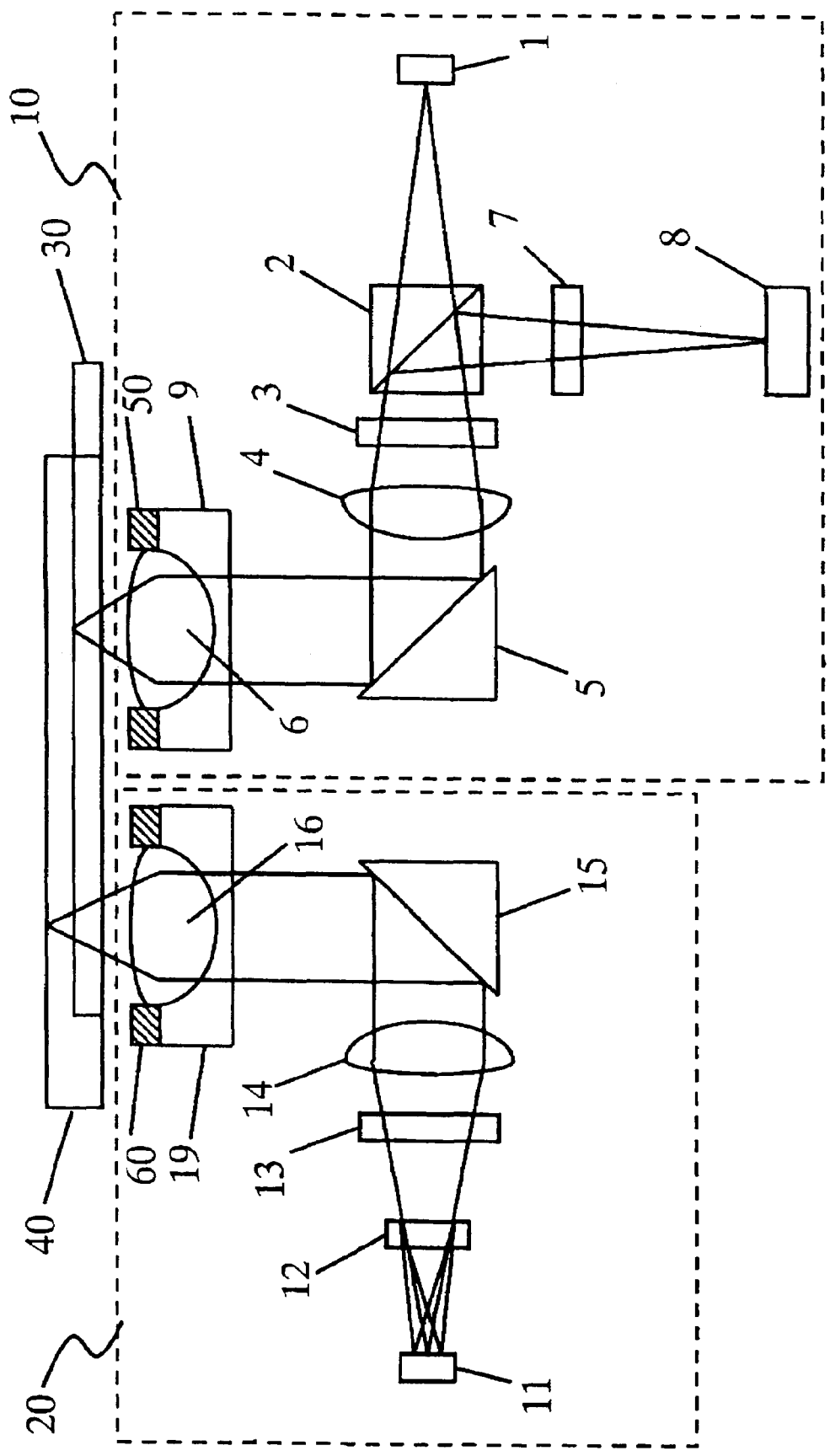
FIG. 1 is a schematic block diagram of an optical heads device in a first embodiment of the present invention.

1: semiconductor laser
2: beam splitter
3: ¼ wavelength plate
4: collimator lens
5: reflecting mirror
6: objective lens
7: anarmorphic lens
8: photosensing element
9: biaxial actuator
10: first optical system
11: photosensing and light emitting integrated element
12: polarization hologram
13: ¼ wavelength plate
14: collimator lens
15: reflecting mirror
16: objective lens
19: biaxial actuator
20: second optical system
30: first optical disk
40: second optical disk
50, 60: contact avoidance unit
70: computing unit
80: control unit
80a: acceleration sensor
81: driving signal generating unit
82: gain selector
83, 84: amplifier
85, 87: high pass filter
86, 88: selector switch
91: lens holder
97: protruded unit
98: stopper
101: semiconductor laser
102: beam splitter
103: ¼ wavelength plate
104: collimator lens
105: reflecting mirror
106: objective lens
107: anamorphic lens
108: photosensing element
109: biaxial actuator
110: first optical system
111: photosensing and light emitting integrated element
112: polarization hologram
113: ¼ wavelength plate
114: collimator lens
115: reflecting mirror
116: objective lens
119: biaxial actuator
120: second optical system
130: first optical disk
140: second optical disk
191: lens holder
192: suspension wire
193: fixing unit
194: coil
195: magnetic yoke 196: magnet
201: objective lens
202: lens barrel
203: lens effective surface
204: collision avoidance unit
205: optical disk

PREFERRED EMBODIMENTS OF THE INVENTION

Embodiments of the present invention will be described below with reference to the drawings.

First Embodiment

FIG. 1 is a schematic block diagram of an optical heads device in a first embodiment of the present invention.

In FIG. 1, reference numeral 1 denotes a semiconductor laser for emitting a laser light of 405 nm in wavelength, reference numeral 2 a beam splitter, reference numeral 3 a ¼ wavelength plate, reference numeral 4 a collimator lens, reference numeral 5 a reflecting mirror, reference numeral 6 an objective lens corresponding to a first objective lens, reference numeral 7 anamorphic lens, reference numeral 8 a photosensing element, reference numeral 9 a biaxial actuator corresponding to first objective lens driving means, and reference numeral 50 a contact avoidance portion, and these constitute a first optical system 10 corresponding to a first optical head.

Similarly, reference numeral 11 denotes a photsensing and light emitting integrated element integrating the semiconductor laser for emitting a laser light of 650 nm in wavelength and the photosensing element, reference numeral 12 a polarization hologram, reference numeral 13 a ¼ wavelength plate, reference numeral 14 a collimator lens, reference numeral 15 a reflecting mirror, reference numeral 16 an objective lens corresponding to a second objective lens, reference numeral 19 a biaxial actuator corresponding to second objective lens driving means, and reference numeral 60 a contact avoidance portion, and these constitute a second optical system 20 corresponding to a second optical head.

Further, reference numeral 30 denotes a first optical disk corresponding to a first information recording medium (for example, equivalent to a Blu-Ray disk) having a transparent substrate of 0.1 mm in thickness, and reference numeral 40 denotes a second optical disk corresponding to a second information recording medium (for example, equivalent to DVD) having a transparent substrate of 0.6 mm in thickness. In FIG. 1, while the first optical disk 30 and the second optical disk 40 are shown to be superposed, in reality, either one only of the optical disks is inserted into a drive (not shown).

The operation in case of performing the reproducing or recording for the first optical disk 30 will be described.

The laser light of a linear polarized light having a wavelength of 405 nm emitted from the semiconductor laser 1 transmits the beam splitter 2, and is converted into a circularly polarized light at the ¼ wavelength plate 3, and after that, is converted into a parallel light at the collimator lens 4, and is reflected at the reflecting mirror 5, and is converged into an information recording layer of the first optical disk 30 as a light spot by the objective lens 6 across the transparent substrate of 0.1 mm in thickness. The laser light reflected at the first optical disk 30 transmits again the objective lens 6, and is reflected at the reflecting mirror 5, and transmits the collimator lens 4, and is converted into a linearly polarized light different from an outward route at the ¼ wavelength plate 3, and after that, it is reflected at the beam splitter 2, and is guided to the photosensing element 8 by the anamorphic lens 7.

The laser light detected by the photosensing element 8 is subjected to photoelectric conversion, and after that, it is arithmetically operated, and generates a focusing error signal for following a surface deviation of the first optical disk 30 and a tracking error signal for following a decentering. The biaxial actuator 9 drives the objective lens 6 in a biaxial direction by these focusing error and tracking error signals, so that the light spot follows an information track of the first optical disk 30 in rotation state. Further, outside the effective diameter portion in the light emitting surface of the objective lens 6, there is formed a contact avoidance portion 50.

Similarly, the operation in case of performing the reproduction or recording for the second optical disk 40 will be described.

The laser light of a linear polarized light having a wavelength of 650 nm emitted from the semiconductor laser inside the photosensing and light emitting integrated element 11 transmits the polarization hologram 12, and is converted into a circularly polarized light at the ¼ wavelength plate 13, and after that, it is converted into a parallel light by the collimator lens 14, and is reflected at the reflecting mirror 15, and is converged into an information recording layer of the second optical disk 40 as a light spot by the objective lens 16 across the transparent substrate having a thickness of 0.6 mm. The laser light reflected at the second optical disk 40 transmits again the objective lens 16, and is reflected at the reflecting mirror 15, and transmits the collimator lens 14, and is converted into a linear polarized light different from the outward route by the ¼ wavelength plate 13, and after that, it is guided to the photosensing element inside the photosensing and light emitting integrated element 11 by the polarization hologram 12.

The laser light detected by the photosensing element inside the photosensing and light emitting integrated element 11 is arithmetically operated after photoelectric conversion, and generates the focusing error signal for following the surface deviation of the second optical disk 40 and the tracking error signal for following the decentering. The biaxial actuator 19 drives the objective lens 16 in the biaxial direction by these focusing error and tracking error signals, so that the light spot follows an information track of the second optical disk 40 in rotation state. Further, outside the effective diameter portion in the light emitting surface of the objective lens 16, there is formed a contact avoidance portion 60.

Figure 2:
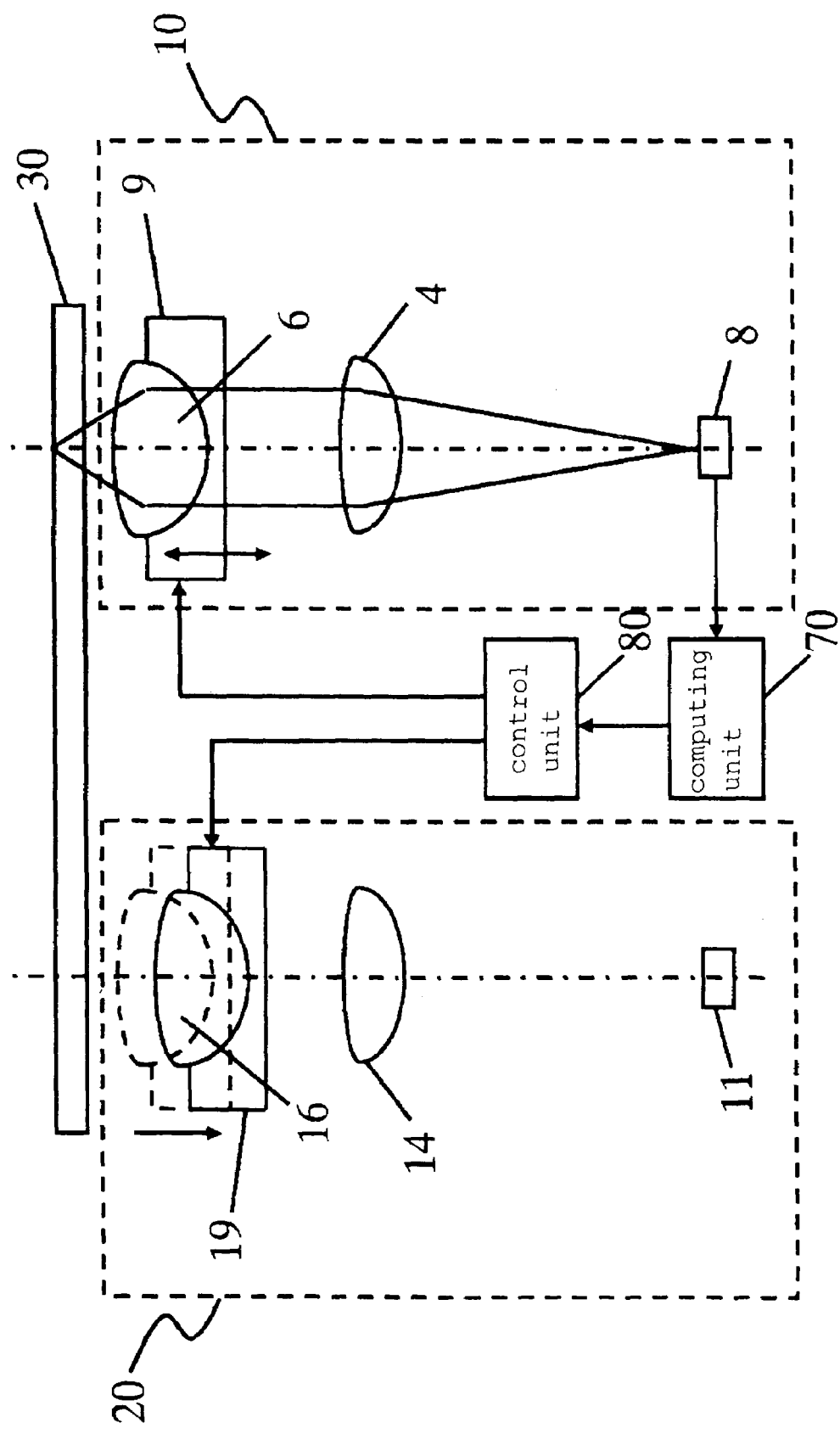
FIG. 2 is a view showing a configuration of the optical heads device and an operation of its collision avoidance in the first embodiment of the present invention.
Figure 3:
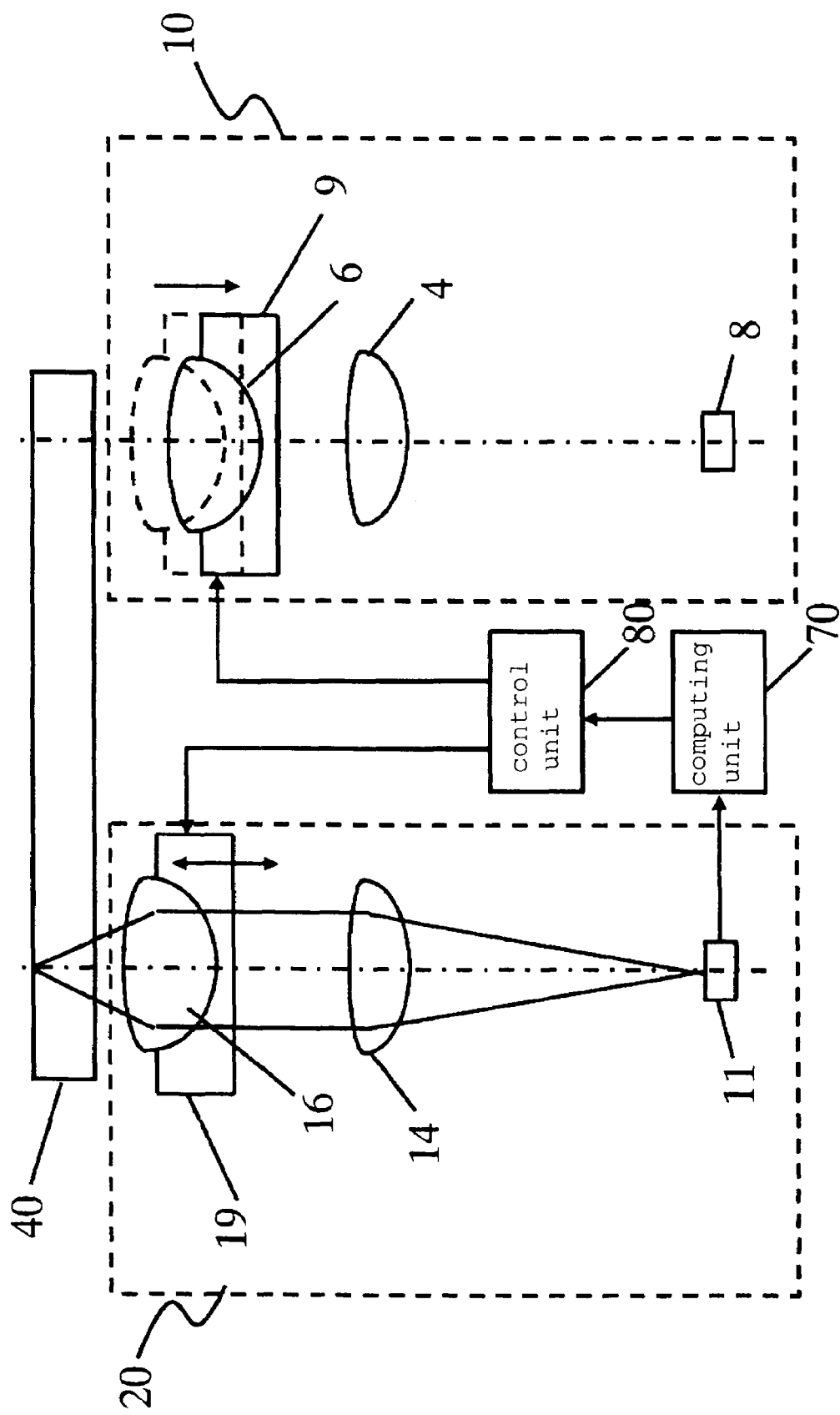
FIG. 3 is a view showing the configuration of the optical heads device and the operation of its collision avoidance in the first embodiment of the present invention.

Next, the operation of the collision avoidance function of the optical heads device in the first embodiment of the present invention will be described by using FIGS. 2 and 3, and at the same time, by so doing, one embodiment of the control method of the optical head of the present invention will be described. In FIGS. 2 and 3, the same reference numerals as FIG. 1 are used for the same configuration as FIG. 1, and the description thereof will be omitted.

First, an execution of the reproduction or recording of information for the optical disk 30 will be described by using FIG. 2. As shown in FIG. 2, the optical heads device in the first embodiment of the present invention comprises a computing unit 70 for subjecting the laser light received by the photosensing element 8 or the photosensing element inside the photosensing and light emitting integrated element 11 to photoelectric conversion and calculating the focusing error signal and the tracking error signal, and a control unit 80 for biaxially driving the biaxial actuator 9 and the biaxial actuator 19 by the focusing error signal and the tracking error signal. The computing unit 70 and the control unit 80 are common to the first optical system 10 and the second optical system 20.

In case the reproduction or recording of information is performed for the optical disk 30, as described above, the first optical system 10 only operates. That is, the laser light emitted from the semiconductor laser 1 (not shown) is reflected at the optical disk 30, and its reflected light is received at the photosensing element 8. In the meantime, in the second optical system 20 which does not contribute to the reproduction or recording of information for the optical disk 30, the semiconductor laser inside the photosensing and light emitting integrated element 11 does not emit a light, and naturally, the reflected light is not received at the photosensing element inside the photosensing and light emitting integrated element 11.

Here, even when the photosensing element inside the photosensing and light emitting integrated element 11 does not receive the reflected light from the optical disk, the control unit 80 causes a certain magnitude of DC current to flow through the coil (not shown) of the biaxial actuator 19, so that the biaxial actuator 19 is held at a predetermined position in an optical axis direction of the objective lens 16 by electromagnetic force between the coil and the magnet of the biaxial actuator 19.

At this time, it is desirable in view of the avoidance of collision that, by causing large the DC current to flow, a static position of the biaxial actuator 19 is put further away from the optical disk 30 than the static position of the objective lens 16 in case the current is not flown to the coil of the biaxial actuator 19. By allowing the actuator 19 to stand still at such a position, for example, even when an external force is applied due to a mobile operation and the like and the biaxial actuator 19 is moved widely, the possibility of the optical disk 30 being away from its maximum movable position is enhanced, so that the collision can be avoided to the most.

Next, the execution of the reproduction and recording of information for the optical disk 40 will be described by using FIG. 3. As shown in FIG. 3, in case the reproduction or recording of information is performed for the optical disk 40, as described above, the second optical system 20 only operates. That is, the laser light emitted from the photosensing and light emitting integrated element 11 is reflected at the optical disk 40, and is received at the photosensing and light emitting integrated element 11. In the meantime, in the first optical system 10 which does not contribute to the reproduction or recording of information for the optical disk 40, the semiconductor laser 1 (not shown) does not emit a light, and naturally, the reflected light is not received by the photosensing element 8.

However, even when the photosensing element 8 does not receive the reflected light from the optical disk, the control unit 80 can cause the current to flow through the coil (not shown) of the biaxial actuator 9, and control the biaxial actuator 9 to a predetermined position. Specifically, the control unit 80, by causing a certain magnitude of the DC current to flow through the coil (not shown) of the biaxial actuator 9, holds the biaxial actuator 9 in the predetermined position along the optical axis of the objective lens 16 by the electromagnetic force between the coil and the magnet of the biaxial actuator 9. This is the same as the case of the biaxial actuator 19, and the static position of the objective lens 6 in case the current is not flown through the coil of the biaxial actuator 9 is arranged further away for the optical disk 40, and even when the biaxial actuator 9 is moved widely, the possibility of the optical disk 40 being away from its maximum movable position is enhanced, so that the collision between the objective lens 6 and the optical disk 40 can be avoided to the most.

In this way, according to the present embodiment, while the reproduction or recording is performed for optical disks 30 or 40, the DC current is applied in order to resist to the elasticity in the optical axis direction of the suspension wires of the biaxial actuators 9 or 19 at the side which does not contribute to the actual operation, and moreover, by this current, the static position of the biaxial actuators 9 or 19 is arranged to be away from the optical disk 30 or 40, so that the collision between the optical disk and objective lens can be reduced even for an impact or a vibration from the outside. Since the control of positioning of the biaxial actuators 9 and 19 is not by a closed loop, it is sometimes unable to deal with an abrupt impact. Hence, it is desirable that the damage of the optical disk or the objective lens due to the collision is alleviated by the contact avoidance portion (contact avoidance portions 50 and 60 in FIG. 1) for conventional impact elimination.

In the above described configuration, though the description was made considering that, while the one optical head is being used to record or reproduce to and from the optical disk, the other optical head is always supplied with the DC current, the DC current may be flown only when the other optical head is in danger of colliding with the optical disk.

Figure 4:
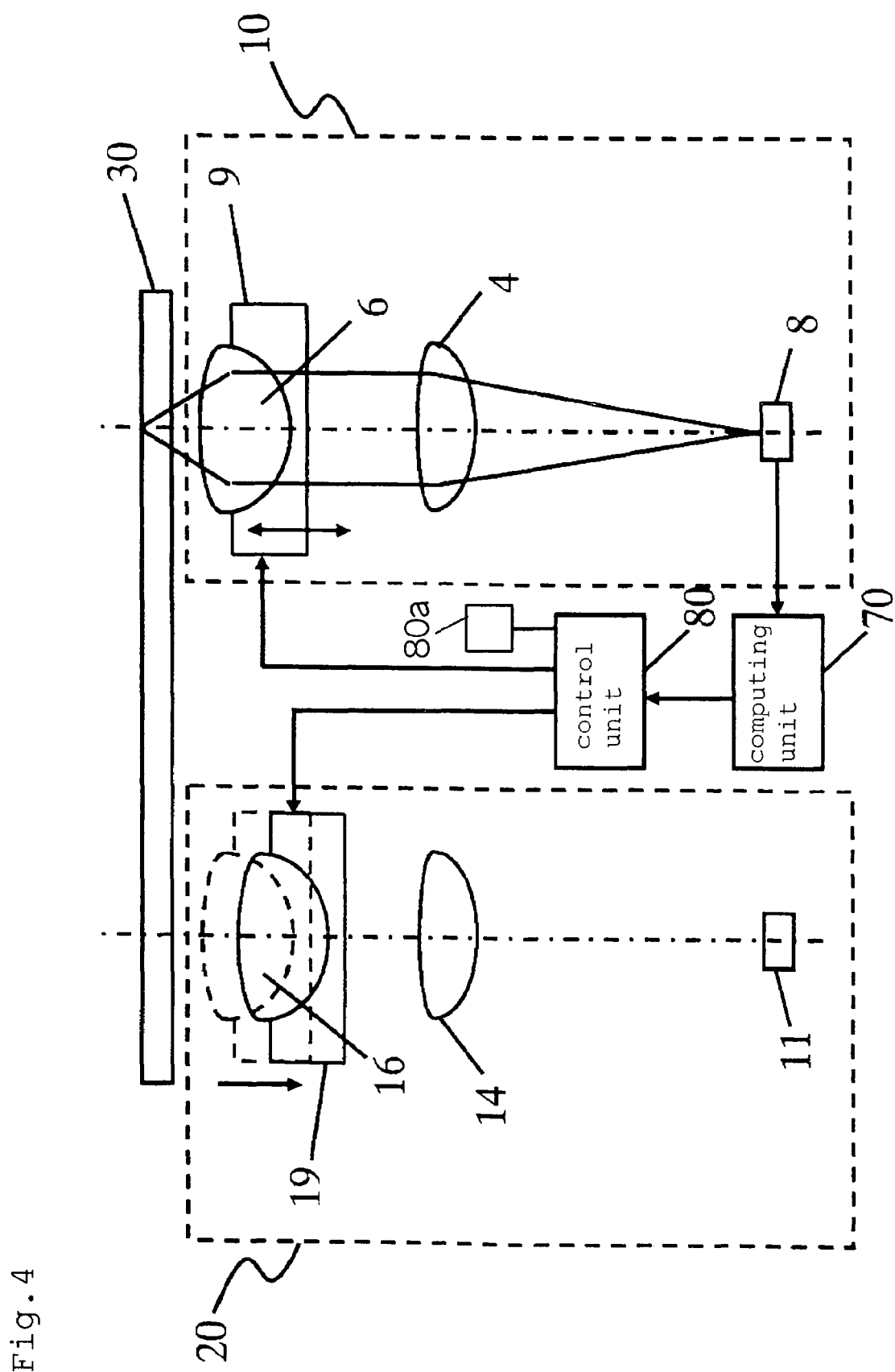
FIG. 4 is a view showing another configuration example of the optical heads device and the operation of its collision avoidance function in the first embodiment of the present invention.

FIG. 4 is an example in which an acceleration sensor 80a connected to the control unit 80 is further added to the configuration shown in FIG. 2. The acceleration sensor 80a is realized by an optical gyroscope and the like.

Describing the case where the reproduction or recording of information is performed for the optical disk 30 as an example, while the first optical system 10 alone performs the operation for reproduction and recording, the second optical system 20 stops the operation. At this time, the current is not flown to the second biaxial actuator 19, which is in a state of being elastically held by the four suspension wires only.

Under this condition, the acceleration sensor 80a, when an external force such as an impact and the like is applied to the optical heads device 10 and a change of posture occurs, these are detected as a change of a magnitude and direction of acceleration, and the detected values thereof are outputted to the control unit 80. The control unit 80, in case the detected value obtained from the acceleration sensor 80a indicates a predetermined direction (direction in which the optical disk and the objective lens collide), and moreover, is equal to or more than a predetermined threshold value, causes the DC current to flow to the second biaxial actuator 19, and performs the same operation as described above, and applies the electromagnetic force for movably controlling the second biaxial actuator 19. In case the reproduction or recording of information is performed for the optical disk 40, the output of the DC current to the first biaxial actuator 9 is controlled by the acceleration detection of the acceleration sensor 80a.

By configuring in this way, in addition to the above described advantage of the collision control, the control unit 80 is no longer required to cause an unnecessary current to flow to the optical system on the side currently not performing the reproduction or recording, thereby providing the power saving of the device.

Further, as another configuration example of the output control of the DC current, the following may serve the purpose. That is, in case the impact is applied from the outside, the driving current of the first biaxial actuator performing the recording or reproduction of information for the optical disk 30 is instantaneously increased because of servo tracking. The control unit 80 monitors the driving current of the first actuator, and compares it to a predetermined set threshold value, and when it is equal to or exceeds the threshold value, the DC current is flown to the second biaxial actuator 19 so as to allow it to perform the same operation as described above. In case the reproduction or recording of information is performed for the optical disk 40, the same control is performed for the first biaxial actuator 9.

By configuring in this way, there is no need to provide the acceleration sensor 80a separately, and the application of the external force such as the impact to the optical heads device 10 and the occurrence of a change of posture are indirectly detected, thereby making it possible to control the output of the DC current to the biaxial actuator.

Second Embodiment

Figure 5:
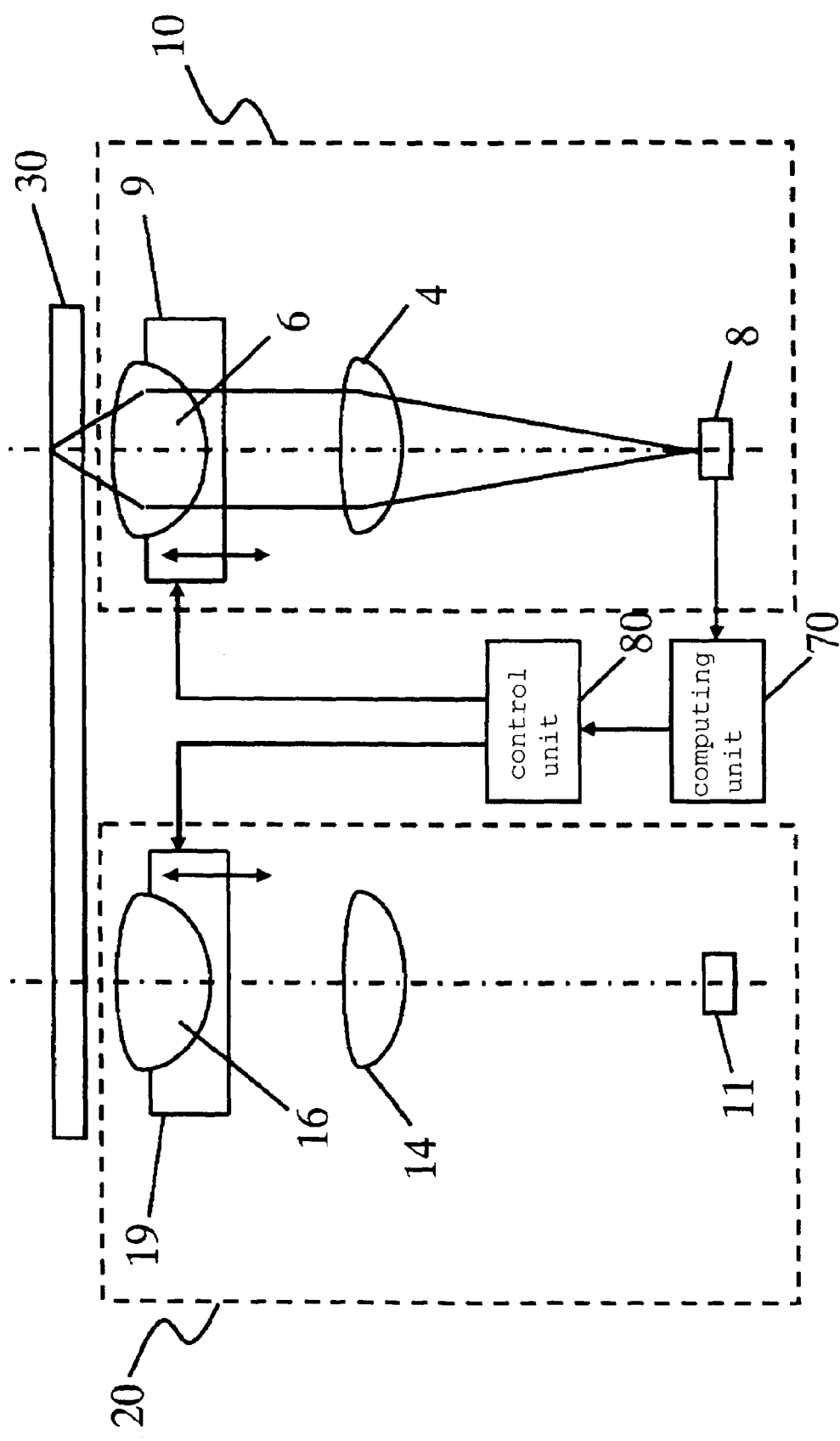
FIG. 5 is a view showing a configuration of an optical heads device and an operation of its collision avoidance in a second embodiment of the present invention.
Figure 6:
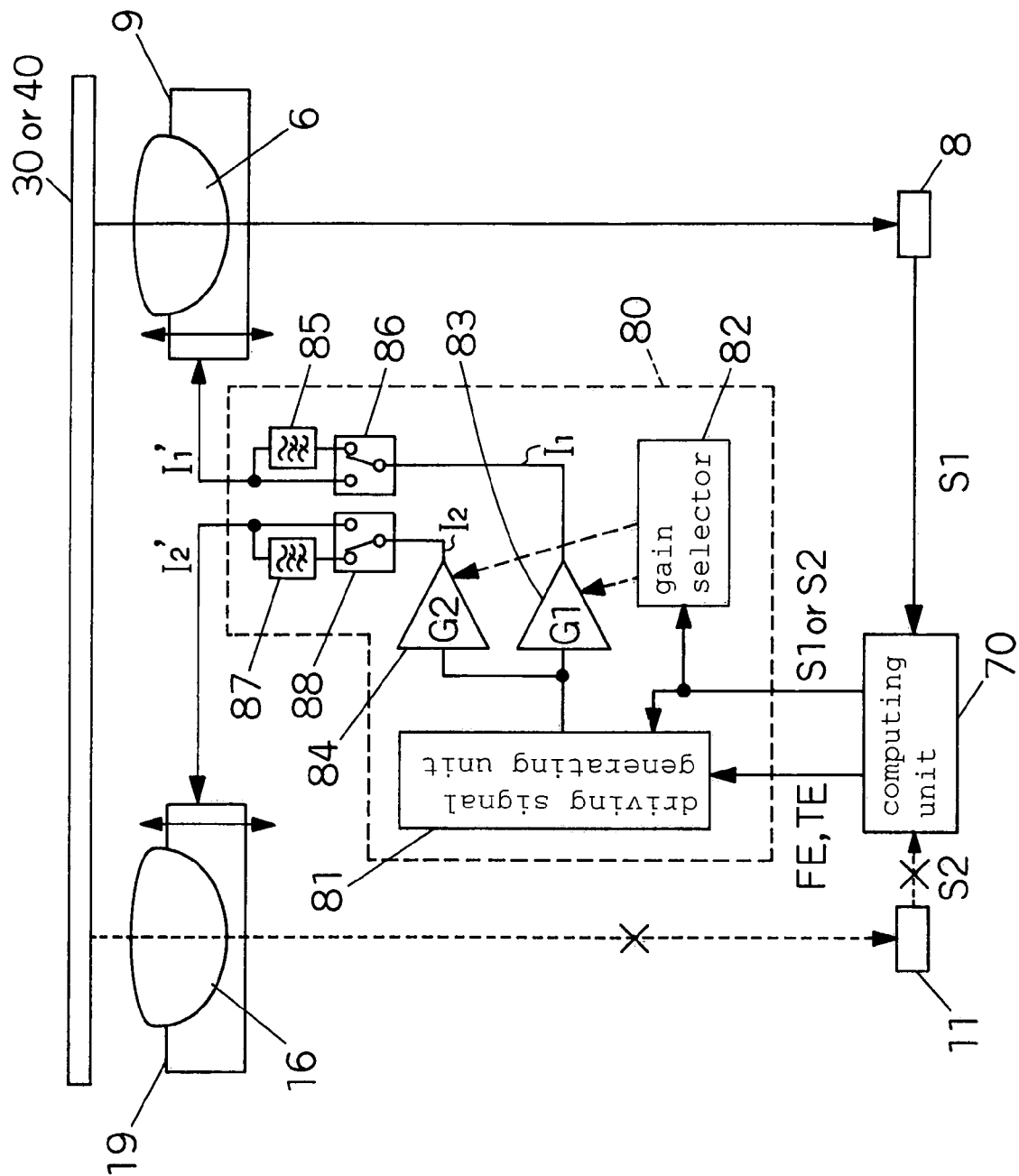
FIG. 6 is a configuration of a control unit 80 of the optical heads device and the operation of its collision avoidance in the second embodiment of the present invention.

Next, the operation of a collision avoidance function of an optical heads device-in a second embodiment of the present invention will be described by using FIGS. 5 and 6. In FIGS. 5 and 6, the same configuration as FIGS. 1 to 3 will be attached with the same reference numeral and the description thereof will be omitted.

First, an-execution of the reproduction or recording of information for an optical disk 30 will be described by using FIG. 5. As shown in FIG. 5, in case the reproduction or recording of information is performed for the optical disk 30, as described above, a first optical system 10 only operates. That is, the laser light emitted from a semiconductor laser 1 (not shown) is reflected at the optical disk 30, and its reflected light is received in a photosensing element 8.

In the meantime, in a second optical system 20 which does not contribute to the reproduction or recording of information for the optical disk 30, the semiconductor laser inside a photosensing and light emitting integrated element 11 does not emit a light, and the reflected light is naturally not received in the photsensing element inside the photosensing and light emitting integrated element 11.

A computing unit 70 computes a focusing error signal from the reflected light from the optical disk 30 received at the photosensing element 8, and a control unit 80 controls the current flown through the coil (not shown) of a biaxial actuator 9 by this focusing error signal. Here, a current corresponding to the current flown through this coil of the biaxial actuator 9 is also flown through the coil (not shown) of a biaxial actuator 19, so that the biaxial actuator 19 can be controlled to a predetermined position.

Further, in FIG. 6 is shown the detail of the control unit 80. The control unit 80 comprises a driving signal generating unit 81 and a gain selector 82, amplifiers 83 and 84 operated by the gain set from the gain selector 82, high pass filters 85 and 87, and selector switches 86 and 88, and the computing units 70 and 80 are common to the first optical system 10 and the second optical system 20.

The operation of the optical heads device according to the second embodiment of the present invention having the above described configuration Willie described below, and at the same time, by so doing, one embodiment of the control method of the optical head of the present invention will be described.

First, a function to avoid a collision between the first optical disk 30 and a second objective lens 16 in case of performing the reproduction or recording of information from and to the first optical disk 30 will be described. In case the reproduction or recording of information for the first optical disk 30 is performed, as described above, the first optical system 10 only operates. That is, the laser light emitted from a semiconductor laser 1 (not shown) is reflected at the optical disk 30, and its reflected light is received in the photosensing element 8.

In the meantime, in the second optical system 20 which does not contribute to the reproduction or recording of information for the optical disk 30, and the semiconductor laser inside the photosensing and light emitting integrated element 11 does not emit a light, and the reflected light is not received in the photsensing element inside the photosensing and light emitting integrated element 11.

The computing unit 70 performs a predetermined computing for an electrical signal S1 received at the photosensing element 8 and subjected to photoelectrical conversion, and generates a focusing error signal FE and a tracking error signal TE, and sends them to the driving signal generating unit 81 and, at the same time, transmits the information indicating that the inputted signal is a signal S1 detected at the photosensing element 8 (or is not the signal S2 detected at the photosensing and light emitting integrated element 11) to the driving signal generating unit 81 and the gain selector 82.

The gain selector 82, based on the information inputted from the computing unit 70 indicating that "the signal inputted to the computing unit 70 is the signal S1", sets a correction gain G1 of the amplifier 83 to 1.0 and a correction gain G2 of the amplifier 84 to a constant k2.

Here, provided that an acceleration sensitivity of the first biaxial actuator 9 is taken as a GS1 (unit: G/A), and an acceleration sensitivity of the second biaxial actuator is taken as a GS2 (unit: G/A), the constant k2 can be represented by:

$$k2=GS1/GS2. \quad \text{(Equation 1)}$$

For example, assuming that GS1=15 (G/A) and GS2=12 (G/A), K2 is set to 1.25.

The driving signal generating unit 81 generates a driving current I1 corresponding to the focusing error signal FE from the information indicating that "the signal inputted to the computing unit 70 is a signal S1". Although the driving current I1 is inputted to the amplifier 83, since the correction gain G1 is 1.0, the signal S1 passes through the amplifier 83 as it is, and moreover, by the switching of a selector switch 86, it is directly inputted to the first biaxial actuator 9, and drives this actuator 9. In this way, the first biaxial actuator 9 is controlled (focus controlled) to a predetermined position along the optical axis.

In the meantime, since the correction gain G2 of the amplifier 84 is set to the constant k2=1.25 by the gain selector 82, when the signal I2 outputted from the driving signal generating unit 81 passes through the amplifier 84, it is amplified according to the correction gain G2, so that the driving current I2 of the second biaxial actuator 19 is generated as $$I2=k2 \cdot I1 \quad \text{(Equation 2)}$$

This driving current I2 is made into a driving current I2' by switching of the selector switch 88 through a high pass filter 87 which cuts a frequency component equal to or below a resonance frequency f02 (unit: Hz) of the second biaxial actuator 19, thereby driving the second biaxial actuator 19.

By driving the second biaxial actuator 19 by the driving current I2', for example, in case of the resonance frequency f02 of the second biaxial actuator 19 as f02=50 (Hz), when impacted in the frequency band exceeding 50 Hz (since the impact frequency band belongs the bandwidth of several KHz, almost all is applicable), the driving current I2' directly proportionate to the driving current I1 of the first biaxial actuator 9 flows into the second biaxial actuator 19, so that the second biaxial actuator 19 is controlled in its position along the optical axis. By this control, the intervals between the first optical disk 30 and the second objective lens 16 are maintained, so that the mutual collision can be avoided.

In contrast, in the case of the vibration and the like in the frequency band of 50 Hz or less, since the first optical disk 30 and the second biaxial actuator 19 (and the second objective lens 16) makes the same movement, there occurs no collision.

When the reproduction or recoding is performed for the first optical disk 30 in this way, even in case the impact and the vibration occur, since the second biaxial actuator 19 which does not contribute to the actual operation is position-controlled in the optical axis direction, and the intervals with the first optical disk 30 are maintained, the collision between the first optical disk 30 and the second objective lens 16 can be avoided.

Similarly, the avoidance of the collision between the second optical disk 40 and the first objective lens 6 in case of performing the reproduction or recording of information from and to the second optical disk 40 will be described.

The computing unit 70 performs a predetermined computing for the electrical signal S2 received at the photosensing and light emitting integrated element 11 and subjected to photoelectrical conversion, and generates a focusing error signal FE and a tracking error signal TE, and transmits them to the driving signal generating unit 81 and, at the same time, sends the information indicating that the inputted signal is a signal S2 detected at the photosensing and light emitting integrated element 11 (or is not the signal S1 detected at the photosensing and light emitting integrated element 11) to the driving signal generating unit 81 and the gain selector 82.

The gain selector 82, based on the information indicating that "the signal inputted to the computing unit 70 is the signal S2", sets a correction gain G1 of the amplifier 83 to a constant k1 and a correction gain G2 of the amplifier 84 to 1.0.

Here, the constant k1 is represented by:

$$k1 = GS2/GS1 \quad \text{(Equation 3)}$$

For example, presuming that GS1=15 (G/V) and GS2=12 (G/V), K1 is set to 0.8.

The driving signal generating unit 81 generates a driving current I2 corresponding to the focusing error signal FE from the information indicating that "the signal inputted to the computing unit 70 is a signal S2". Although the driving current I2 is inputted to the amplifier 83, since the correction gain G2 is 1.0, the signal S1 passes through the amplifier 84 as it is, and moreover, by the switching of the selector switch 88, it is directly inputted to the first biaxial actuator 19, and drives this actuator 19. In this way, the second biaxial actuator 19 is controlled (focus controlled) to a predetermined position along the optical axis.

In the meantime, since the correction gain G1 of the amplifier 83 is set to the constant k1=0.8 by the gain selector 82, when the signal I1 outputted from the driving signal generating unit 81 passes through the amplifier 83, it is amplified according to the correction gain G1, so that the driving current I1 of the first biaxial actuator 9 is generated as $$I1 = k1 \cdot I2 \quad \text{(Equation 4)}$$

This driving current I1 is made into a driving current I1' by the switching of the selector switch 86 through a high pass filter 85 which cuts a frequency component equal to or less than a resonance frequency f01 (unit: Hz) of the first biaxial actuator 9, thereby driving the first biaxial actuator 9.

When the reproduction or recoding is performed for the first optical disk 40 in this way, even in case the impact and the vibration occur, since the first biaxial actuator 9 which does not contribute to the actual operation is position-controlled in the optical axis direction, and the intervals with the second optical disk 40 are maintained, the collision between the second optical disk 40 and the first objective lens 6 can be avoided.

There are the cases where the distance with the second objective lens 16 changes by the surface deviation of the first optical disk 30, and moreover, due to the displacement by gravity by a difference of posture of the optical heads device itself, a neutral position (position of the second biaxial actuator 19 in case the driving current does not flow) in the optical axis direction of the second objective lens 16 is closer to the first optical disk 30.

Further, the objective lens 6 and the objective lens 16 are different in the distance (working distance) to the optical disk, and the objective lens smaller in the working distance has a strong possibility of colliding with the optical disk.

In view of the above described points, it is desirable the driving current I2' after passing through the high pass filter 87 is superposed with, for example, the DC current which displaces the distance of a total of 0.5 mm or more, which is a sum of the surface deviation (about 0.3 mm) of the first optical disk 30 and the amount of the displacement by gravity (about 0.2 mm) of the second biaxial actuator 19 itself due to a difference of posture, and an initial position in the optical axis direction of the second objective lens 16 is put away from the neutral position for the first optical disk 30. It is desirable that this superposing operation of the DC current is similarly performed for the first biaxial actuator 9.

Further, since the position control of the second biaxial actuator 19 is not by a closed loop, it is sometimes unable to deal with an abrupt impact. Hence, it is desirable that the damages of the first optical disk 30 and the second objective lens 16 by an accidental collision are alleviated if only slightly by providing a contact avoidance portion 60 for conventional impact elimination. This holds true also with the first biaxial actuator 9.

Further, in the above described configuration, though the description was made considering that, while the one optical system is being used to record or reproduce to and from the optical disk, the other optical system is always used to control the position along the optical axis based on the current used for the operation of the one optical system, this position control may be performed only when the biaxial actuator of the other optical system is in danger of colliding with the optical disk.

That is, in case the impact is applied from the outside, the driving current of the first biaxial actuator 9 performing the recording or reproduction of information for the optical disk 30 is instantaneously increased because of focusing servo. In the control unit 80, the driving signal generating unit 81 monitors the driving current of the first actuator, and compares it to a predetermined set threshold value, and when it is equal to or exceeds the threshold value, the gain selector 82 and the other units therein are operated, so that the driving current I2' generated by the above described manner is outputted to the second biaxial actuator 19. In case the reproduction or recording of information is performed for the above optical disk 40, the same control is performed for the first biaxial actuator 9.

By configuring in this way, in addition to the above described advantage of the collision control, the control unit 80 has no longer the necessity of performing an unnecessary control to the optical system at the side currently not performing the reproduction or recording, thereby realizing the power saving of the device.

In the above described configuration, the selector switches 86 and 88, and the high pass filters 85 and 87 may be omitted.

Third Embodiment

Figure 7:
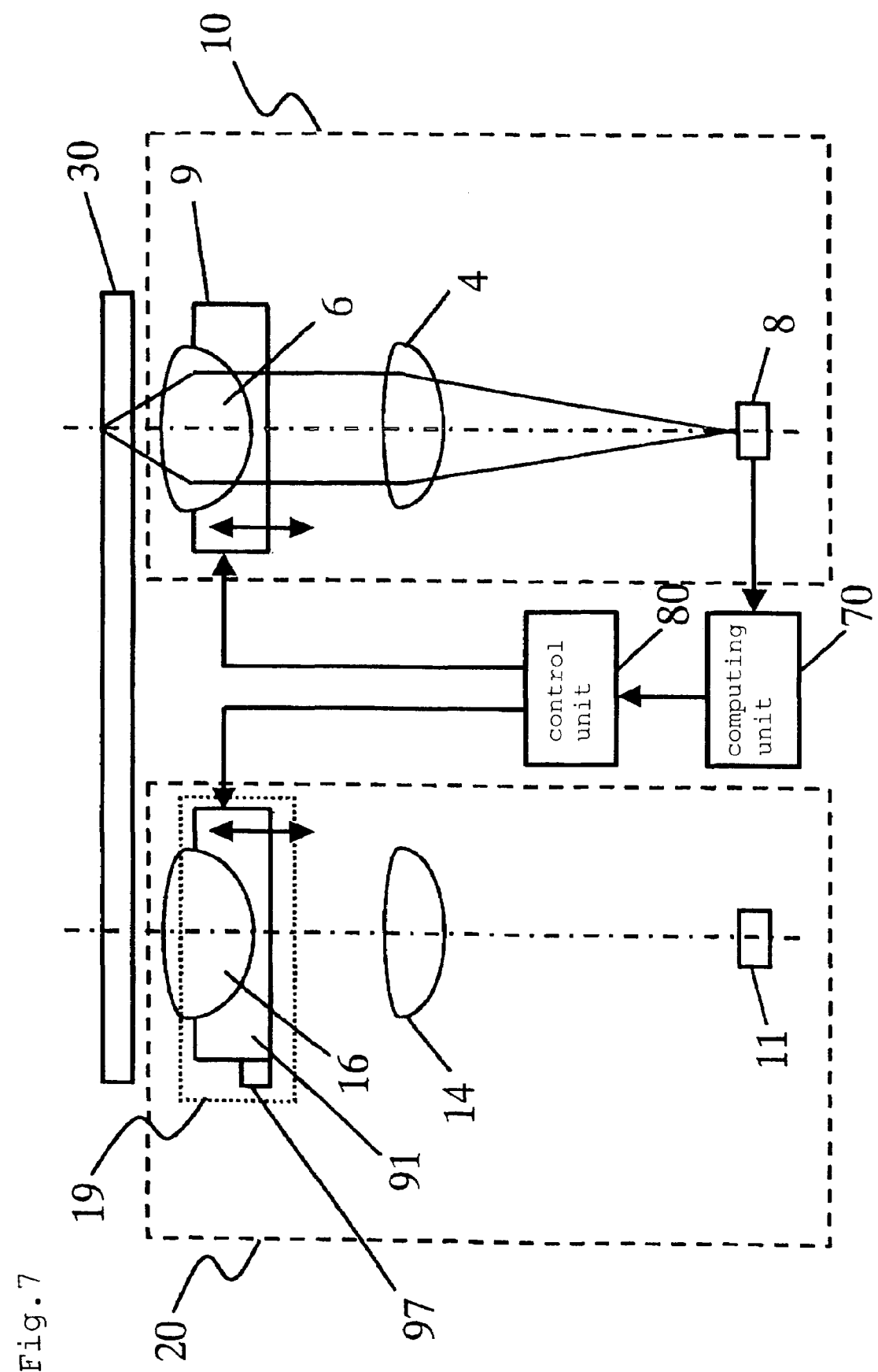
FIG. 7 is a view showing a configuration of an optical head and an operation of its collision avoidance in a third embodiment of the present invention.
Figure 9:
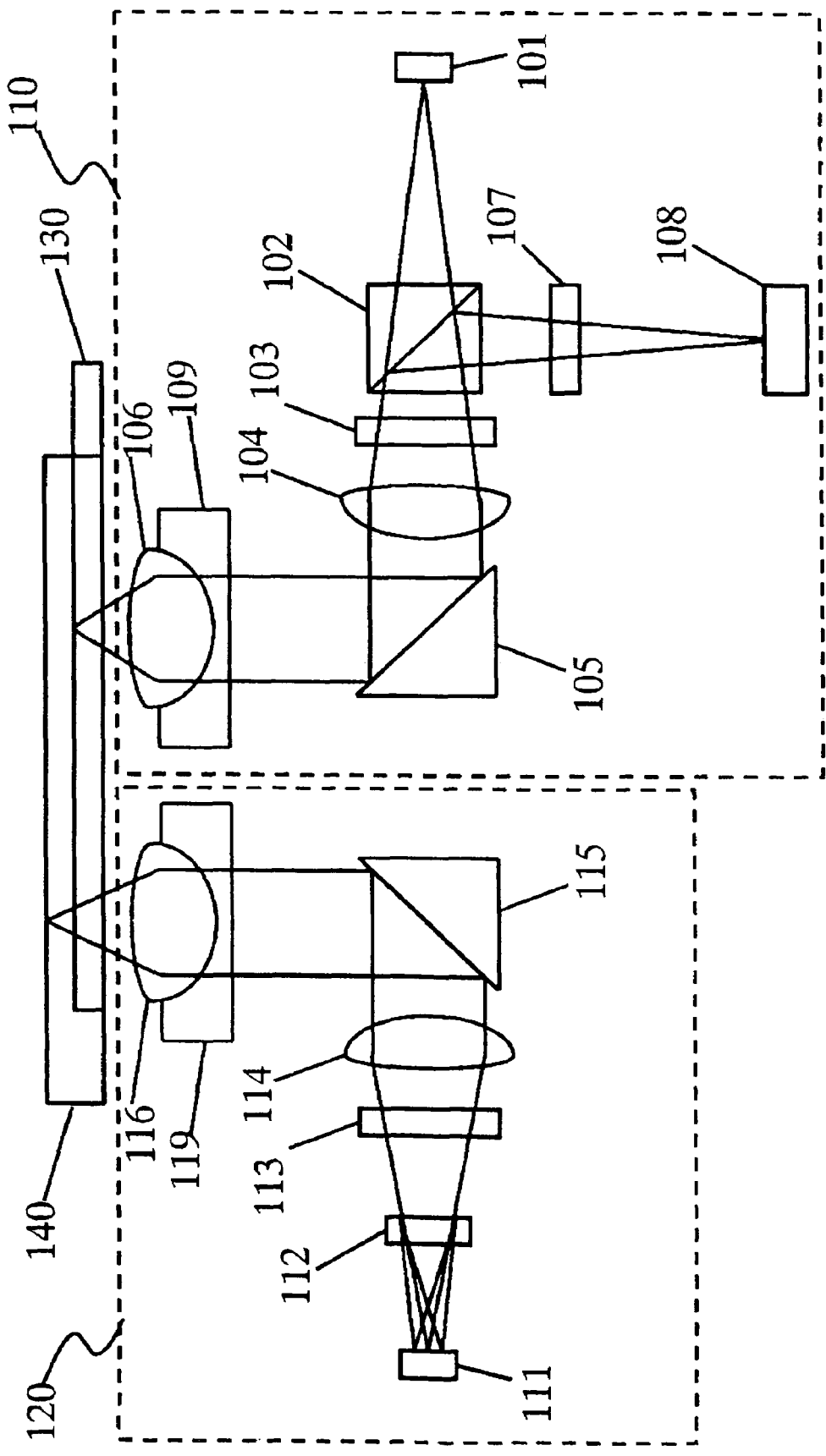
FIG. 9 is a schematic block diagram of the optical heads device for selecting a conventional objective lens and performing the reproduction or recording of information.
Figure 10A:
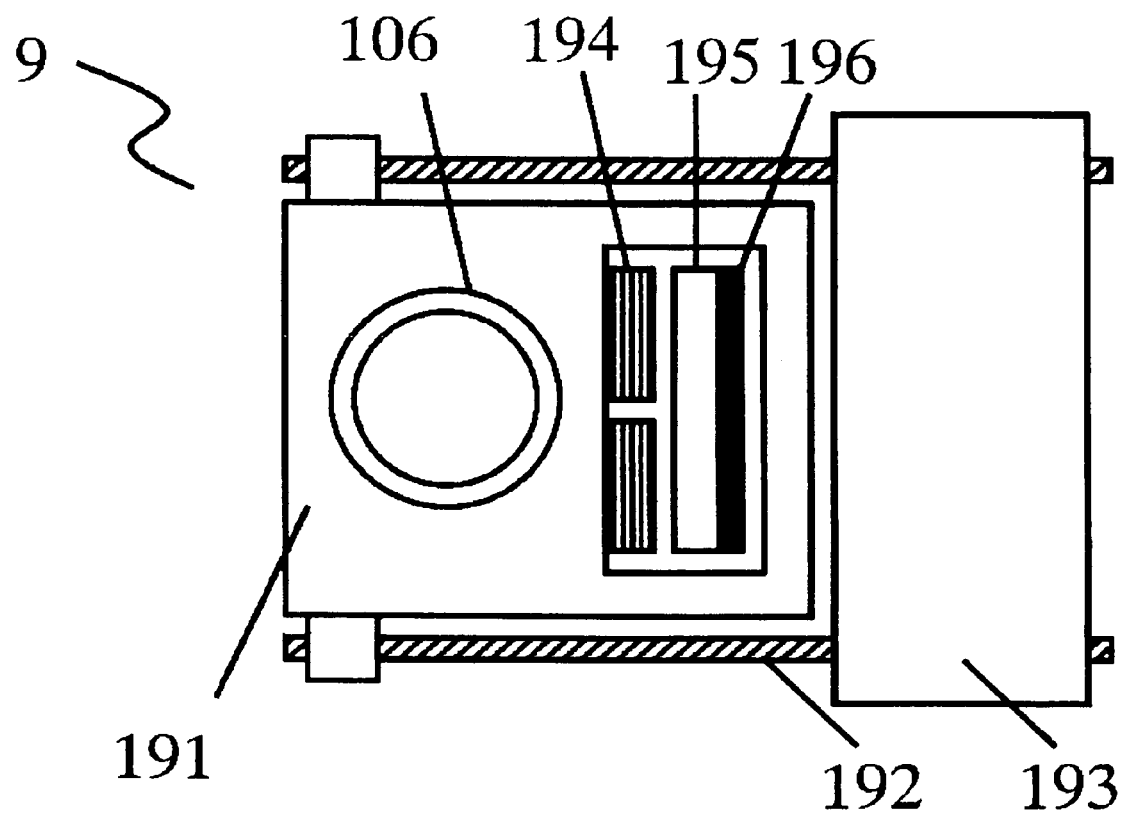
FIG. 10(a) is a top view schematically showing a biaxial actuator configuration.
Figure 10B:
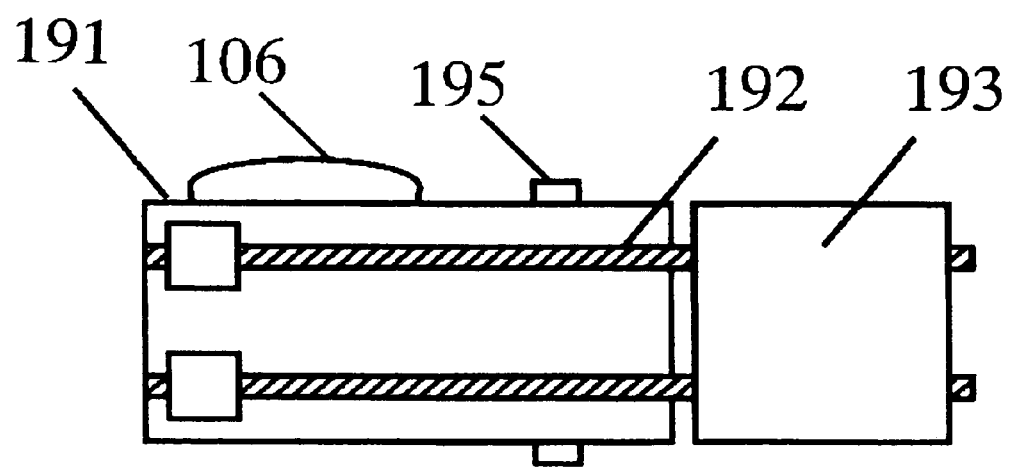
FIG. 10(b) is a side view schematically showing the biaxial actuator configuration.
Figure 11A:
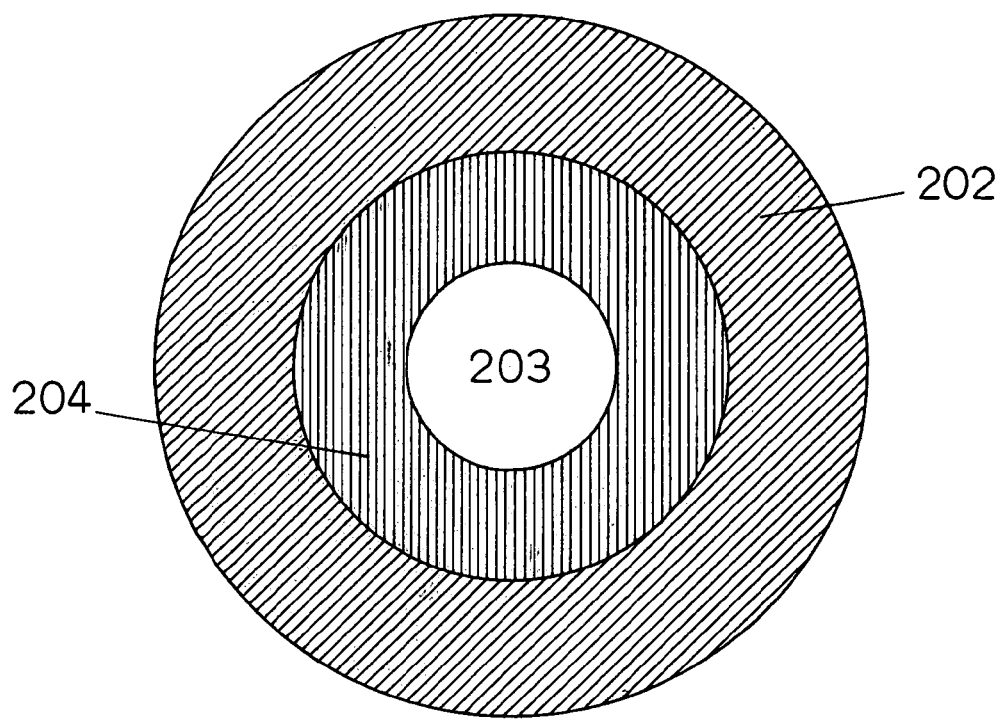
FIG. 11(a) is a schematic top view of an objective lens comprising a conventional collision avoidance function.
Figure 11B:
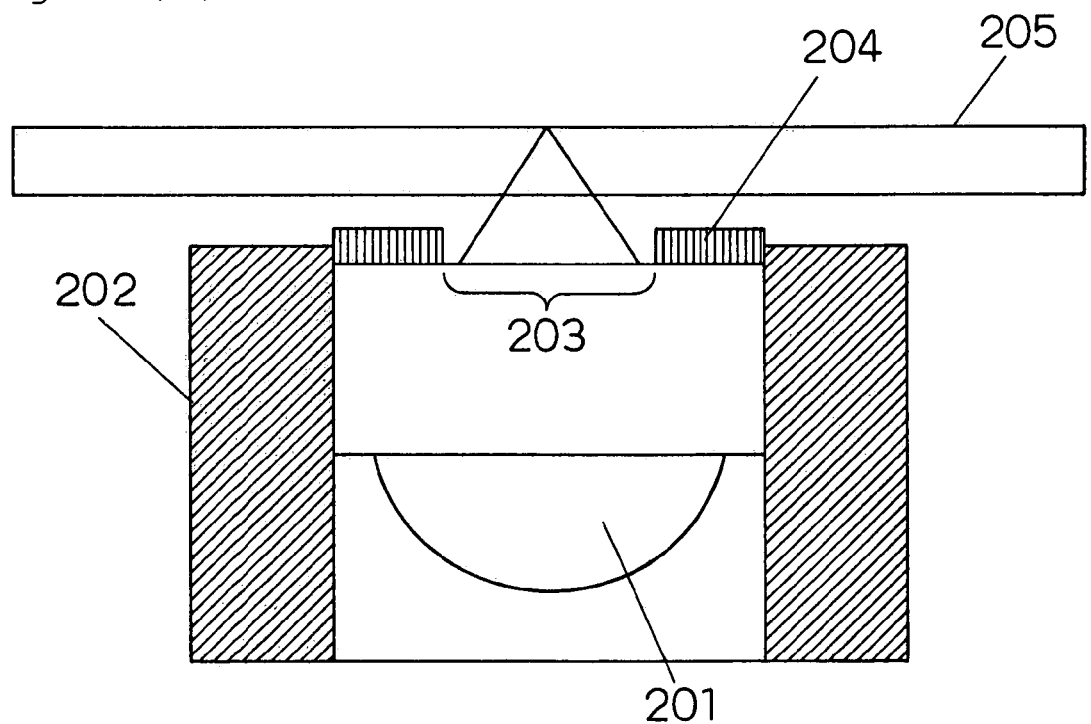
FIG. 11(b) is a schematic side view of the objective lens comprising the conventional collision avoidance function.

Next, an operation of a collision avoidance function of an optical heads device in a third embodiment of the present invention will be described by using FIGS. 7 and 8(a) to 8(c). In FIGS. 7 and 8, the same configurations as FIGS. 1 to 3 will be attached with the same reference numerals, and the description thereof will be omitted.

In FIG. 7, reference numerals 91 denotes a lens holder configuring an biaxial actuator 19, which is integrally formed with an objective lens 16, and configures a movable portion. The lens holder 91 is movably supported in a focusing direction and a tracking direction, and controls a position of an objective lens 16 in a biaxial direction by the current flown through the coil (not shown). The lens holder 91 is provided with a protruded unit 97.

Further, in FIG. 8, reference numeral 98 denotes a stopper, which performs a position regulation of the lens holder 91 along the optical axis by the protruded unit 97. The stopper 98 is provided for the optical head main body (not shown), and can move in the direction of an arrow mark x of FIG. 8(a) by means of an unillustrated coil and a magnet. The current through the coil of the stopper 98 is outputted by the control from a control unit 80.

The operation of the optical heads device according to the third embodiment of the present invention having the above described configuration will be described below, and at the same time, by so doing, one embodiment of the control method of the optical head of the present invention will be described.

As shown in FIG. 7, in case the recording or reproduction is performed for an optical disk 30, as described above, a first optical system 10 only operates. A computing unit 70 computes a focusing error signal from a reflected light from the optical disk 30 received at a photosensing element 8, and the control unit 80 controls the current flown through the coil (not shown) of a biaxial actuator 9 by this focusing error signal.

In the meantime, the control unit 80, when detecting that the optical disk 30 is inserted, as shown in FIG. 8(b), causes a DC current to flow through the coil (not shown) of a biaxial actuator 19 to drive the lens holder 91 in a direction (in the direction of an arrow mark y) in which the holder keeps away from the disk. Further, the control unit 80, as shown in FIG. 8(c), moves the stopper 98 in the direction of an arrow mark x so as to perform the position regulation of the protruded unit 97 of the lens holder 91 kept away from the disk in the axial direction. After that, while the control unit 80 stops a supply of power source through the coil (not shown) of the biaxial actuator 19, the biaxial actuator 19 is controlled in displacement to the axial direction by the protruded unit 97 and the stopper 98. That is, granted that the maximum displacement occurs, since the biaxial actuator 19 is fixed by physical contact between the protruded unit 97 and the stopper 98, even for the impact or the vibration from the outside, the collision between the optical disk 30 and the objective lens 16 can be avoided.

It is desirable to alleviate the damage of the optical disk and the objective lens due to collision by the conventional contact avoidance portion for impact elimination by assuming that the protruded unit 97 and the stopper 98 are dislocated due to an extremely large impact.

Further, in the above explanation, though the description was made that the stopper 98 is provided for the optical head main body (not shown), and is operated by means of the coil and the magnet (not shown), the driving of the stopper 98 may be performed by the mechanical composition such as a stepping motor and the like.

In the first to the third embodiments, though the description was on the operation in case of providing the collision avoidance function for preventing the objective lens 16 and the optical disk 30 from colliding at the time of the reproduction or recording of the optical disk 30 as well as the collision avoidance function for preventing the objective lens 9 and the optical disk 40 from colliding at the time of the reproduction and the recording of the optical disk 40, and moreover, the same collision avoidance function for the objective lens 6 and the objective lens 16, the present invention is not limited to the first to the third embodiments, but, for example, even in case different collision avoidance functions are provided for the objective lens 6 and the objective lens 16, and moreover, even in case the collision avoidance function is not provided for either one of the objective lens when the damage of the objective lens and the optical disk can be fully controlled by providing a contact avoidance portion shown in FIG. 1, it is apparent that the present invention can be applicable.

Further, the first optical system 10 and a second optical system 20 are not limited to the optical system of the present embodiment, but, when they are optical systems for selecting plural objective lenses for two or more types of optical disks different in thickness of transparent substrate and performing the reproduction or recording of information, the optical systems can be used regardless of the types. Further, at least one optical system from among the optical systems may be an optical system comprising the objective lens corresponding to the reproduction or recording of the optical disks of two or more types different in wavelength, for example, one optical system capable of reproducing or recording of the disk of a CD system or a DVD system.

In each of the above described embodiments, the optical heads device 10 is corresponding to the optical heads device of the present invention, and the first optical system 10 is corresponding to the first optical head of the present invention, and the second optical system 20 is corresponding to the second optical head of the present invention. Further, the objective lens 6 and 16 are corresponding to the first objective lens and the second objective lens of the present invention, respectively, and the first biaxial actuator 9 and the second biaxial actuator 19 are corresponding to the first objective lens driving means of the present invention and the second objective lens driving means of the present invention, respectively. Further, the computing unit 70 and the control unit 80 are corresponding to the collision avoidance means of the present invention.

Further, a driving signal generating unit 81 in the control unit 80, a gain selector 82 and amplifiers 83 and 84 are corresponding to the correction means of the present invention. Further, the lens holder 91 and the stopper 98 including the protruded unit 97 are corresponding to the regulating means of the present invention. In addition an acceleration sensor 80*a* is corresponding to the acceleration sensor of the present invention. Further, the current for driving the optical head which is outputted from the control unit 80 to the first biaxial actuator 9 and the second biaxial actuator 19 is corresponding to the control signal of the present invention.

However, the present invention is not limited to each of the above described embodiments. In the second embodiment, though the control signal of the present invention was described as the current outputted to the biaxial actuators 9 and 19, the control signal may be realized as a voltage or a pulse. In this case, the biaxial actuators 9 and 19 are driven by the voltage or the pulse from the control unit 80.

Further, in the above described configuration, though an acceleration sensor 80*a* was used in the first embodiment, it may be used as a trigger of the operation of the control unit 80 in each configuration of the second and third embodiments. Further, in the second embodiment, though the optical system in which the control of the collision avoidance is performed was described as being driven by driving currents I1' and I2' based on the driving current from the optical system which performs the reproduction or recording to the optical disk, an independent control may be performed without using the driving currents I1' and I2'. That is, a semiconductor laser is allowed to emit a light to the optical disk, and a focusing control only is performed based on its reflected light, thereby a distance control with the optical disk may be preformed. At this time, the focusing control is not necessarily performed for an information recording layer of the optical disk, but may be performed for the surface of the optical disk. For example, the objective lens 6 of the first optical system 10 is unable to apply a servo for the information recording layer of the second optical disk 40 shown in the first to third embodiments. This is because the thickness (0.6 mm) of the second optical disk 40 is larger than the thickness (0.1 mm) of the first optical disk 30 primarily corresponding to the first optical system 10. In such a case, the focusing control of the first optical system 10 for avoiding the collision between the first objective lens 16 of the first optical system and the second optical disk 40 is performed not for the information recording layer of the optical disk 40, but for the surface of the optical disk.

Further, in the above described embodiments, though the description was made that the gain selector 82 as an example of the correction means of the present invention decides a gain based on the acceleration sensitivity of both the biaxial actuators, the gain may be based on either one of the biaxial actuators. Further, the gain may be set based on other characteristics of the optical head of the present invention such as the weight of the biaxial actuator and the like.

Further, the present invention may be realized as an optical information reproducing device and an optical information recording device comprising the above described optical heads device as reproducing means or recording means. As such an optical information reproducing device and an recording device, a mobile type computer comprising an optical disk drive, a portable type music player for reproducing an optical disk, a portable type video recorder for performing the recording and reproduction for the optical disk and the like can be cited.

A program according to the present invention is a program for executing a whole or a part of the steps of the operation of the control method of the optical head of the present invention by a computer, and maybe a program which operates in collaboration with a computer.

Further, the present invention is a medium in which a program is recorded to allow a computer to execute a whole or a part of the operations of a whole or a part of the steps of the control method of the optical head of the present invention, and may be a medium in which the program readable and read by the computer executes the operation in collaboration with the computer.

The "part of the steps" of the present invention means several steps inside the plural steps or a part of operation inside one step.

Further, the recording medium recording the program of the present invention and readable by the computer is also included in the present invention.

Further, an application form of the program of the present invention is recorded in the recording medium readable by the computer, and may have an operation mode to collaborate with the computer.

Further, an application form of the program of the present invention transmits inside a transmission medium, and is read by the computer, and may have an operation mode to collaborate with the computer.

Further, as a data configuration of the present invention, the types of database, data format, data table, data list, data and the like are included.

Further, as the recording medium, ROM and the like are included, and as the transmission medium, a transmission mechanism such as an Internet and the like, a light, an electric wave, a sound wave and the like are included.

Further, the above described computer of the present invention is not limited to a pure hardware such as CPU and the like, but it may include a firmware, OS, and still more, peripheral equipment.

As described above, the configuration of the present invention may be realized soft-wise or realized hardware-wise.

The optical heads device according to the present invention can be applicable to the optical disk device performing the reproduction or the recording of information for two or more type of optical disks having the transparent substrate different in thickness. In particular, the optical head is useful for the optical disk device performing the reproduction or recording of information for the superdense optical disk having the transparent substrate in thickness of about 0.1 mm.

What is claimed is:

1. An optical heads device for reproducing or recording two or more types of information recording medium different from each other, comprising:
    a first optical head comprising a first objective lens for reproducing or recording a signal from and to a first information recording medium, and a first objective lens driving means of performing a focusing operation for allowing said first objective lens to follow an information track of said first information recording medium;
    a second optical head comprising a second objective lens for reproducing or recording a signal from and to the second information recording medium, and a second objective lens driving means of performing a focusing operation for allowing said second objective lens to follow an information track of said second information recording medium, and
    collision avoidance means of avoiding a collision between said first information recording medium and said second objective lens when said first optical head operates to reproduce or record the signal from and to said first information recording mediums, wherein
    said collision avoidance means controls said second objective lens driving means by corresponding to a movement of said first objective lens driving means, so that the collision between said first information recording medium and said second objective lens is avoided.

2. The optical heads device according to claim 1, wherein said collision avoidance means allows said second objective lens driving means to operate by using a control signal corresponding to the control signal for allowing said first objective lens driving means to operate, so that the collision between said first information recording medium and said second objective lens is avoided.

3. The optical heads device according to claim 2, wherein said control signal is an electric current.

4. The optical heads device according to claim 3, wherein said collision avoidance means has correction means of correcting a current for allowing said first objective lens driving means to operate based on at least the characteristic of said second optical head, and said second objective lens driving means is driven by the current corrected by said correction means.

5. The optical heads device according to claim 3, wherein said correction means corrects the current for allowing said first objective lens driving means to operate by a gain based on the acceleration sensitivity of said first objective lens driving means and the acceleration sensitivity of said second objective lens driving means.

6. The optical heads device according to claim 4, wherein said correction means has a high pass filter,
the current for allowing said first objective lens driving means to operate or the current corrected by said gain is passed by said high pass filter; and
said high pass filter cuts off a frequency comonoent of which frequency is equal to or less than a resonance freguency of said second objective lens driving means.

7. An optical heads device for reproducing or recording two or more types of information recording medium different from each other, comprising:
a first optical head comprising a first objective lens for reproducing or recording a signal from and to a first information recording medium, and a first objective lens driving means of performing a focusing operation for allowing said first objective lens to follow an information track of said first information recording medium;
a second optical head comprising a second objective lens for reproducing or recording a signal from and to the second information recording medium, and a second objective lens driving means of performing a focusing operation for allowing said second objective lens to follow an information track of said second information recording medium, and
collision avoidance means of avoiding a collision between said first information recording medium and said second objective lens when said first optical head operates to reproduce or record the signal from and to said first information recording medium, wherein
said collision avoidance means controls said second optical head to operate independently from a movement of said first optical head, thereby avoiding the collision between said first information recording medium and said second objective lens.

8. The optical heads device according to claim 7, wherein said collision avoidance means performs a control in such a manner that said second objective lens driving means performs a focusing operation for the surface or the information recording layer of said first information recording medium.

9. The optical heads device according to claim 7, wherein said collision avoidance means has an acceleration sensor for detecting an acceleration applied to said optical heads device, and controls the operation of said second objective lens driving means based on the magnitude and direction of the acceleration detected by said acceleration sensor so that said second objective tens does not contact the surface of said first information recording medium.

10. The optical heads device according to claim 7 or 9, wherein said collision avoidance means controls the operation of said second objective lens driving means so that said second objective lens moves in a direction in which said second objective lens keeps away from said first information recording medium by the current of a constant magnitude.

11. The optical heads device according to claim 7, wherein said collision avoidance means comprises regulating means of regulating a movable range of said second objective lens so that the intervals between the surfaces of said second objective lens and said first information recording medium are substantially kept constant.

12. The optical heads device according to claims 1 or 7, wherein said collision avoidance means performs an operation of said avoiding of collision when a control signal that exceeds predetermined threshold value flows to said first objective lens driving means at the operation time of said first optical head.

13. The optical heads device according to claims 1 or 7, wherein said collision avoidance means avoids the collision between said second information recording medium and said first objective lens when said first optical head operates to reproduce or record the signal from and to said second information recording medium.

14. The optical heads device according to claim 13, wherein said collision avoidance means controls said first objective lens driving means by corresponding to the operation of said second objective lens driving means, so that the collision between said second information recording medium and said first objective lens is avoided.

15. The optical heads device according to claim 14, wherein said collision avoidance means allows said first objective lens driving means to operate by using the control signal corresponding to the control signal for allowing said second objective lens driving means to operate, so that the collision between said second information recording medium and said first objective lens is avoided.

16. The optical heads device according to claim 15, wherein said control signal is an electric current.

17. The optical heads device according to claim 15, wherein said collision avoidance means has correction means of correcting a current for allowing said second objective lens driving means to operate based on at least the characteristic of said first optical head, and said first objective lens driving means is driven by the current corrected by said correction means.

18. The optical heads device according to claim 17, wherein said correction means corrects the current to allow said second objective lens driving means to operate by the gain based on the acceleration sensitivity of said first objective lens driving means and the acceleration sensitivity of said second objective lens driving means.

19. The optical heads device according to claim 18, wherein said correction means has a high pass filter for cutting a frequency component in the current for operating said second objective lens driving means or the current corrected by said gain equal to or less than a resonance frequency of said first objective lens driving means.

20. The optical heads device according to claim 13, wherein said collision avoidance means controls said first optical head to operate independently from the operation of said second optical head, thereby avoiding the collision between said second information recording medium and said first objective lens.

21. The optical heads device according to claim 20, wherein said collision avoidance means performs a control in such a manner that said first objective lens driving means performs a focusing operation for the surface or the information recording layer of said second information recording medium.

22. The optical heads device according to claim 20, wherein said collision avoidance means has an acceleration sensor for detecting an acceleration applied to said optical heads device, and controls the operation of said first objective lens driving means based on the magnitude and direction of the acceleration detected by said acceleration sensor so that said first objective lens does not contact the surface of said second information recording medium.

23. The optical heads device according to claim 20, wherein said collision avoidance means controls the operation of said first objective lens driving means so that said first objective lens moves in a direction in which said first objective lens keeps away from said second information recording medium by the current of a constant magnitude.

24. The optical heads device according to claim 13, wherein said collision avoidance means comprises regulating means of regulating a movable range of said first objective lens so that the intervals between the surfaces of said first objective lens and said second information recording medium are substantially kept constant.

25. The optical heads device according to claim 13, wherein said collision avoidance means performs an operation of said avoiding of collision when a control signal that exceeds predetermined threshold value flows to said first objective lens driving means at the operation time of said first optical head.

26. The optical heads device according to claims 1 or 7, wherein at least either one from among said first objective lens and said second objective lens is an objective lens compatible to the reproduction or recording of two or more types of the information recording medium having different wavelengths.

27. An optical information reproduction device, comprising reproducing means of reproducing information from two or more types of information recording medium different from each other, wherein said reproducing means uses the optical heads device according to claim 1.

28. An optical information reproduction device, comprising recording means of recording information for two or more types of information recording medium different from each other, wherein said recording means uses the optical heads device according to claim 1.

29. In an optical heads device for reproducing or recording two or more types of information recording medium different from each others, a control method for controlling the operations of a first optical head comprising a first objective lens for reproducing or recording a signal from and to a first information recording medium and first objective lens driving means of performing a focusing operation for allowing said first objective lens to follow an information track of said first information recording medium, and a second optical head comprising a second objective lens for reproducing or recording a signal from and to a second information recording medium, and second objective lens driving means of performing a focusing operation for allowing said second objective lens to follow an information track of said second information recording medium, wherein, said method comprises a step of controlling said second objective lens driving means by corresponding to the movement of said first objective lens driving means when said first optical head operates to reproduce or record the signal from and to said first information recording medium, and by said step, a collision between said first information recording medium and said second objective lens is avoided.

30. A program of the control method of the optical head according to claim 29, said program allowing a computer to execute a step of controlling said second objective lens driving means by corresponding to the operation of said first objective lens driving means when said first optical head operates to reproduce or record the signal from and to said first information recording medium.

31. A recording medium, that can be processed by a computer and stores a program according to claim 30.

32. The optical heads device according to claim 22, wherein said collision avoidance means controls the operation of said first objective lens driving means so that said first objective lens moves in a direction in which said first objective lens keeps away from said second information recording medium by the current of a constant magnitude.

33. An optical information reproduction device, comprising reproducing means of reproducing information from two or more types of information recording medium different from each other, wherein said reproducing means uses the optical heads device according to claim 13.

34. An optical information reproduction device, comprising recording means of recording information for two or more types of information recording medium different from each other, wherein said recording means uses the optical heads device according to claim 13.

* * * * *

UNITED STATES PATENT AND TRADEMARK OFFICE
CERTIFICATE OF CORRECTION

PATENT NO. : 7,366,072 B2
APPLICATION NO. : 11/005071
DATED : April 29, 2008
INVENTOR(S) : Fumitomo Yamasaki et al.

It is certified that error appears in the above-identified patent and that said Letters Patent is hereby corrected as shown below:

At Column 23, line 32 of the Letters Patent, in claim 6, "freguency" should read -- frequency --

At Column 24, line 4 of the Letters Patent, in claim 9, "tens" should read -- lens --

Signed and Sealed this

Sixteenth Day of September, 2008

JON W. DUDAS
*Director of the United States Patent and Trademark Office*